(12) United States Patent
Gieske et al.

(10) Patent No.: US 10,852,172 B2
(45) Date of Patent: Dec. 1, 2020

(54) DOSING CLOSURE AND CONTAINER UTILIZING THE SAME

(71) Applicant: MCCORMICK & COMPANY, INCORPORATED, Hunt Valley, MD (US)

(72) Inventors: Thomas Koll Porter Gieske, Lutherville, MD (US); Tracie L. C. Wilson, Westminster, MD (US)

(73) Assignee: MCCORMICK & COMPANY, INCORPORATED, Hunt Valley, MD (US)

( * ) Notice: Subject to any disclaimer, the term of this patent is extended or adjusted under 35 U.S.C. 154(b) by 0 days.

(21) Appl. No.: 15/717,263

(22) Filed: Sep. 27, 2017

(65) Prior Publication Data

US 2018/0094959 A1 Apr. 5, 2018

Related U.S. Application Data

(60) Provisional application No. 62/402,458, filed on Sep. 30, 2016.

(51) Int. Cl.
*G01F 11/26* (2006.01)
*B65D 47/12* (2006.01)
*B65D 47/26* (2006.01)
*B65D 83/06* (2006.01)
*B65D 47/08* (2006.01)

(52) U.S. Cl.
CPC ........ *G01F 11/262* (2013.01); *B65D 47/0842* (2013.01); *B65D 47/127* (2013.01); *B65D 47/261* (2013.01); *B65D 47/265* (2013.01); *B65D 83/06* (2013.01); *G01F 11/261* (2013.01); *B65D 47/12* (2013.01)

(58) Field of Classification Search
CPC ...... G01F 11/26; G01F 11/261; G01F 11/262; G01F 11/263; G01F 11/265; G01F 11/268; B65D 47/26; B65D 47/261; B65D 47/265
See application file for complete search history.

(56) References Cited

U.S. PATENT DOCUMENTS 2,243,452 A * 5/1941 Bickel .................. G01F 11/261
                                                          222/455
3,185,357 A * 5/1965 Merkel .................. A47G 19/34
                                                          222/42

(Continued)

OTHER PUBLICATIONS

PCT Search Report issued in PCT/US17/53674 dated Jan. 5, 2018.
Chinese Office Action dated Jul. 13, 2020 and issued in CN No. 201780060557.6.

*Primary Examiner* — J C Jacyna
(74) *Attorney, Agent, or Firm* — Greenblum & Bernstein, P.L.C.

(57) ABSTRACT

Doser for a container containing a substance. The doser includes a dosing member configured to be located at least partially inside a dispensing end of a container. The dosing member includes at least a bottom wall, a retaining wall and a retaining space of predetermined volume configured to retain a dispensable amount of said substance. When the doser is arranged on a container and the container dispenses the dispensable amount of the substance, the dosing member substantially prevents the substance contained in the container from either passing into the retaining space or being dispensed with the dispensable amount.

12 Claims, 26 Drawing Sheets

(56) References Cited

U.S. PATENT DOCUMENTS

| | | | |
|---|---|---|---|
| 3,917,129 A | 11/1975 | Cavazza | |
| 4,015,758 A * | 4/1977 | Cavazza | G01F 11/261 222/457.5 |
| 4,120,432 A * | 10/1978 | Fuchs | B65D 83/06 222/565 |
| 4,346,823 A * | 8/1982 | Eppenbach | G01F 11/261 222/443 |
| 5,054,660 A | 10/1991 | Sherman | |
| 5,078,305 A | 1/1992 | Glynn | |
| 5,480,071 A * | 1/1996 | Santagiuliana | B65D 83/06 220/254.2 |
| 5,601,213 A | 2/1997 | Daniello | |
| 6,948,641 B1 * | 9/2005 | Williams | G01F 11/261 222/456 |
| 10,203,235 B1 * | 2/2019 | Gottfried | G01F 11/003 |
| 2006/0151548 A1 | 7/2006 | Seris | |
| 2010/0147903 A1 * | 6/2010 | Farside | G01F 11/262 222/454 |
| 2011/0163132 A1 | 7/2011 | Moreau | |
| 2014/0203050 A1 * | 7/2014 | Blackburn | G01F 11/261 222/426 |
| 2015/0048122 A1 | 2/2015 | Skillin | |

* cited by examiner

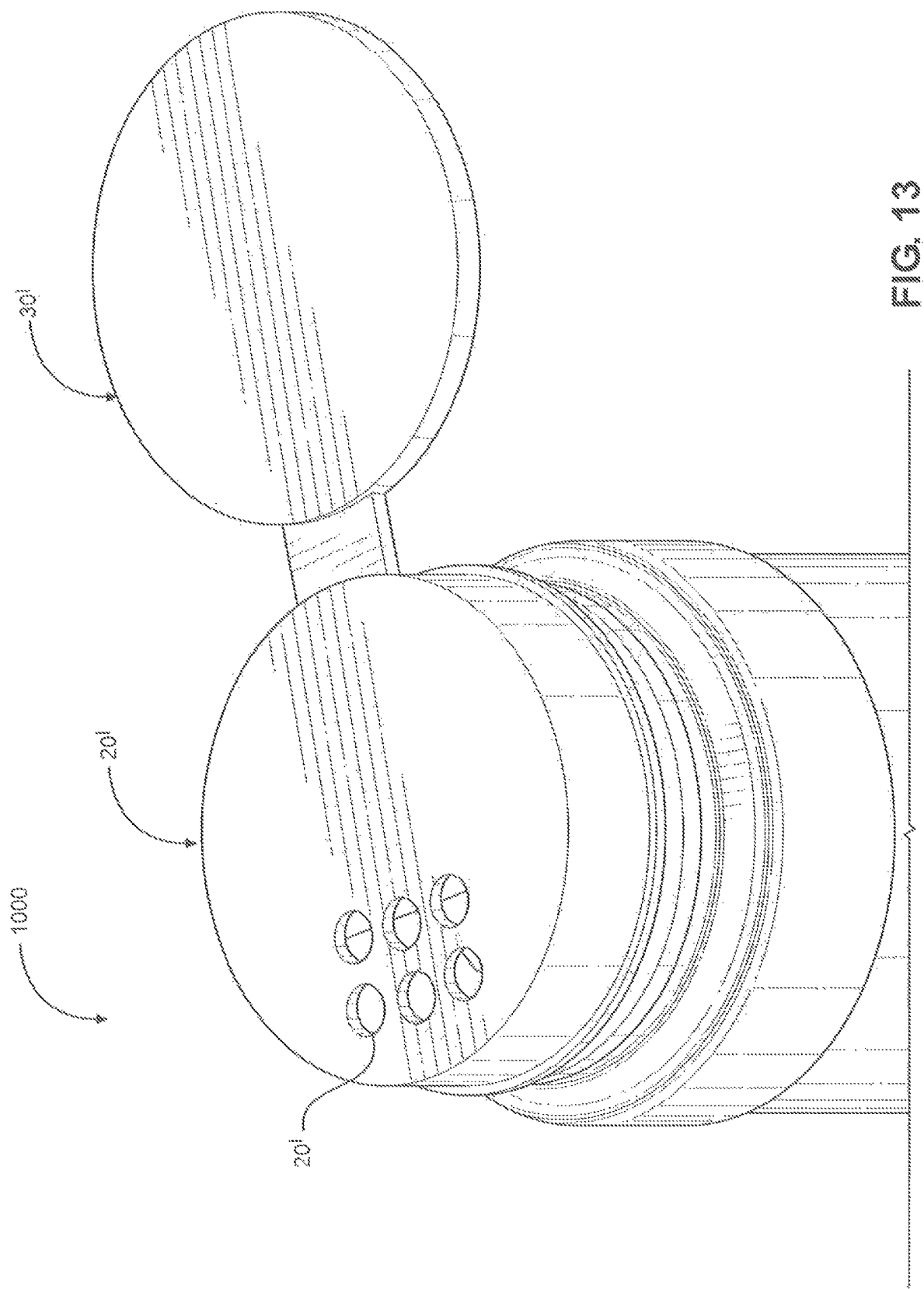

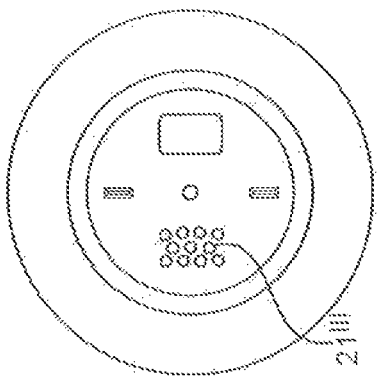
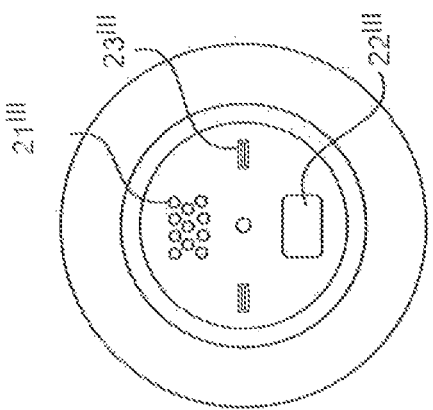
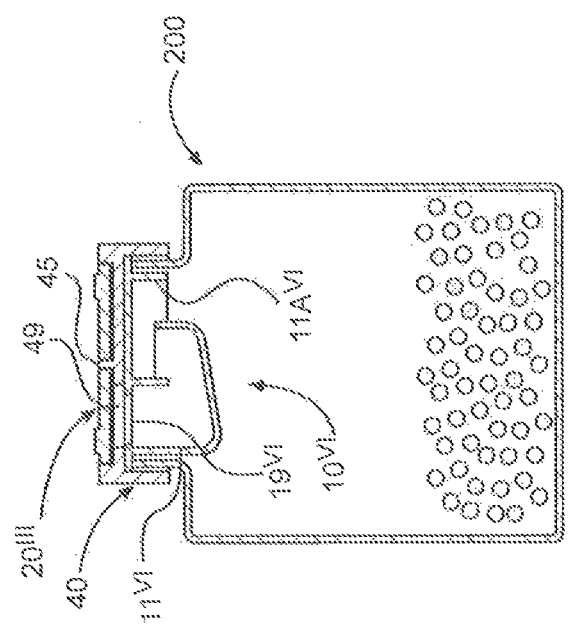
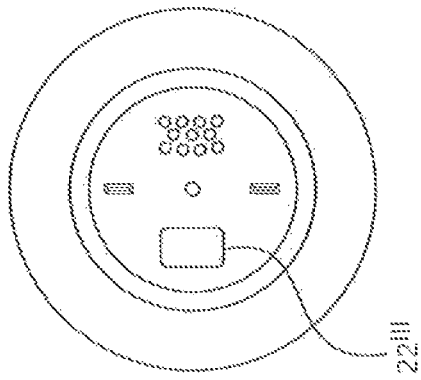

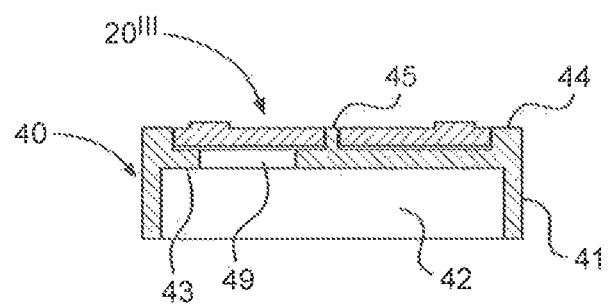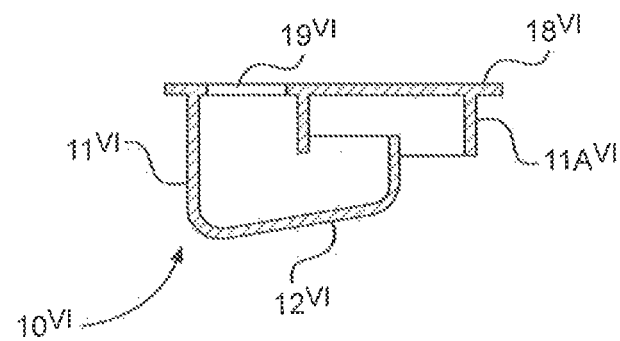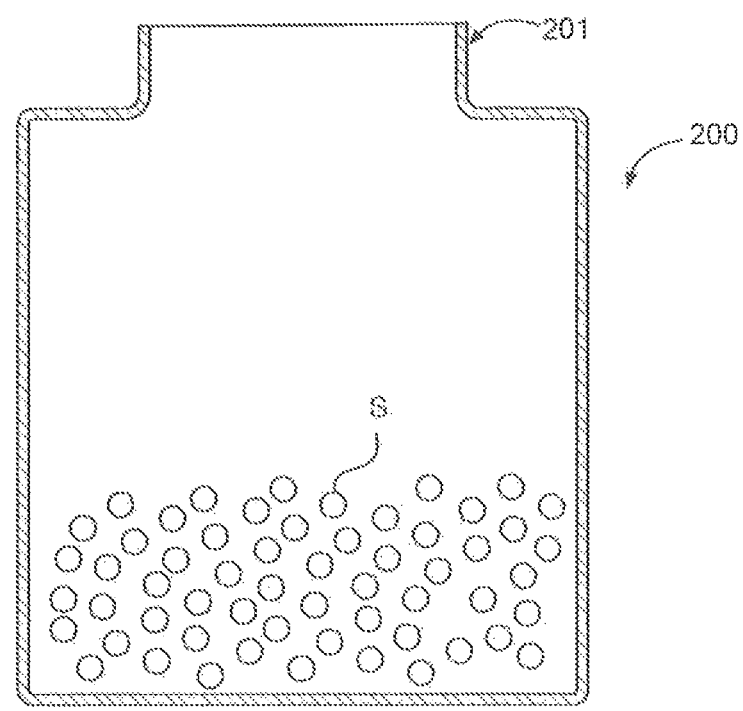
FIG. 22

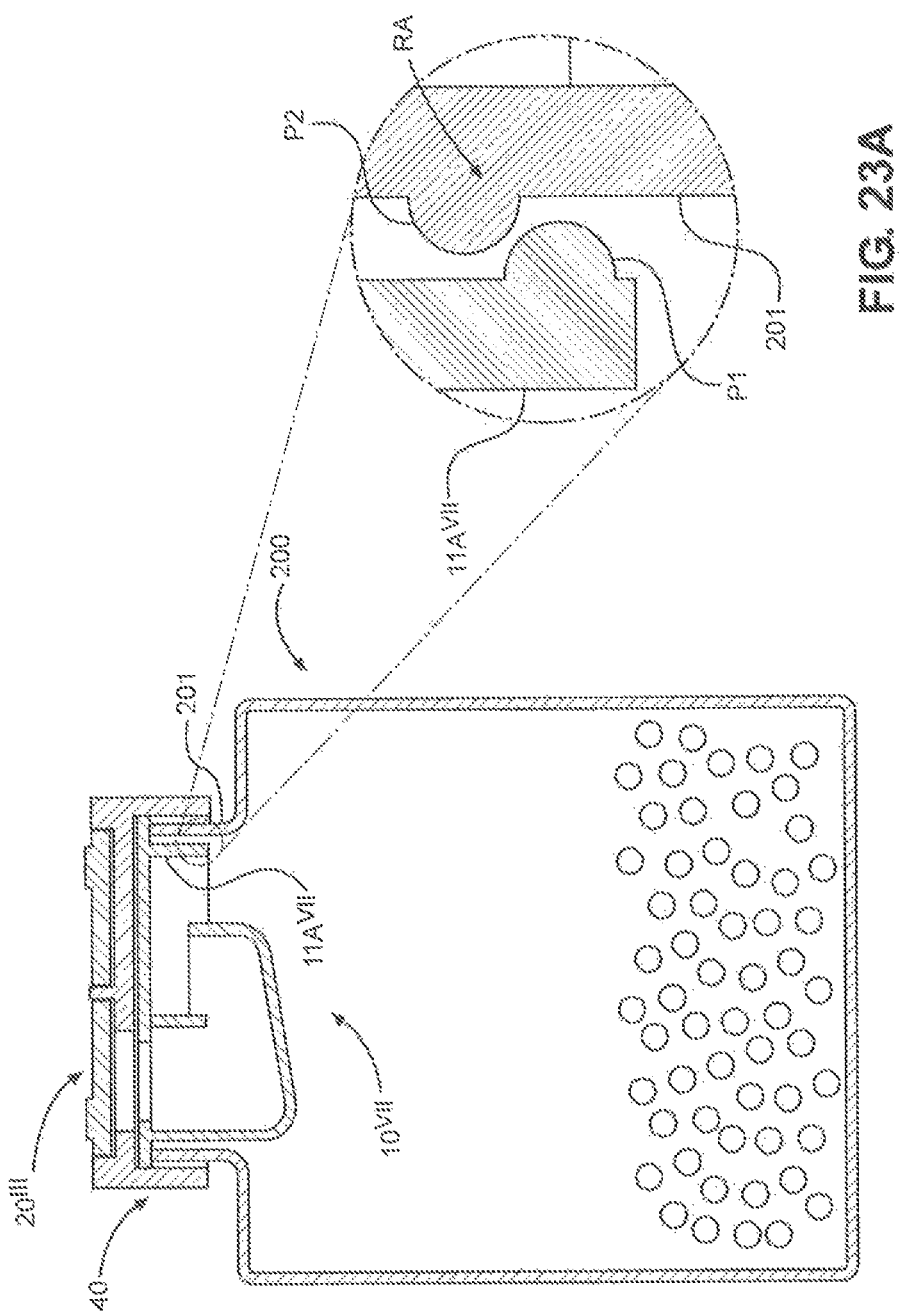

FIG. 25
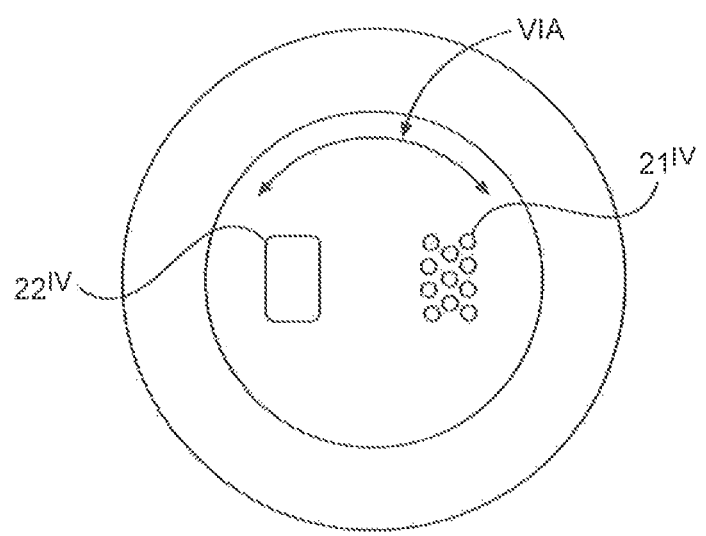
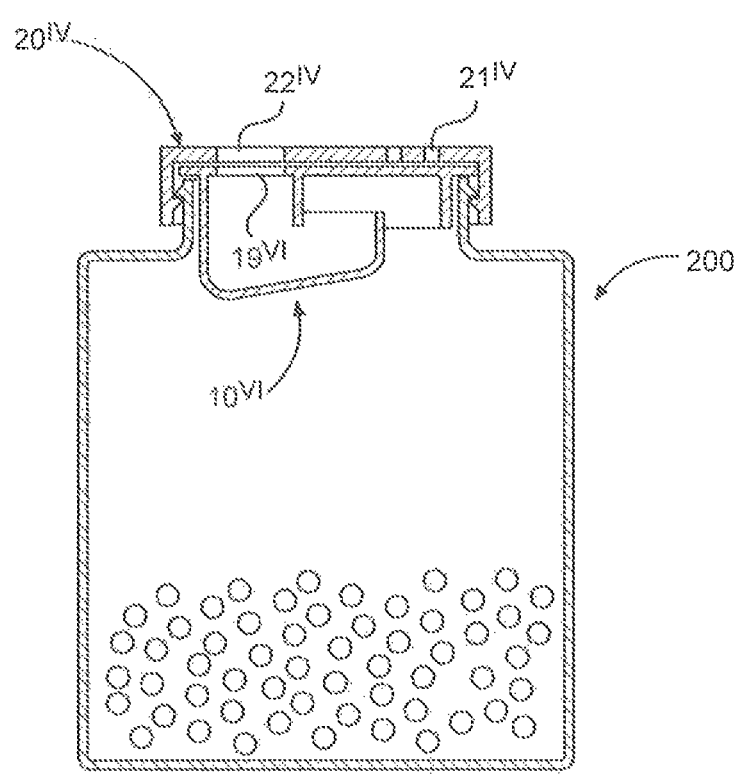
FIG. 24

FIG. 27
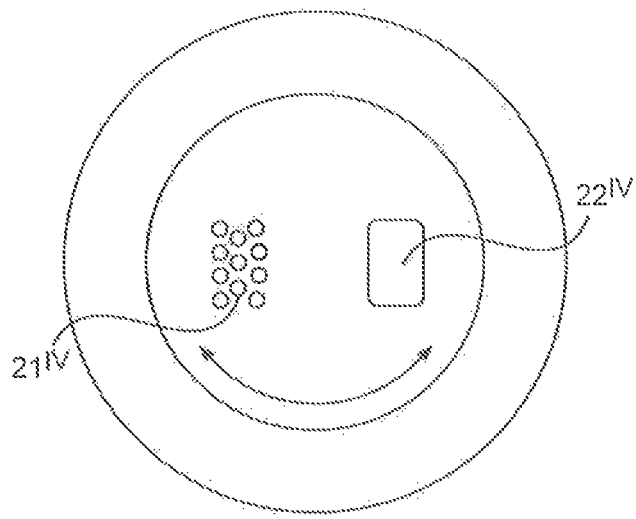
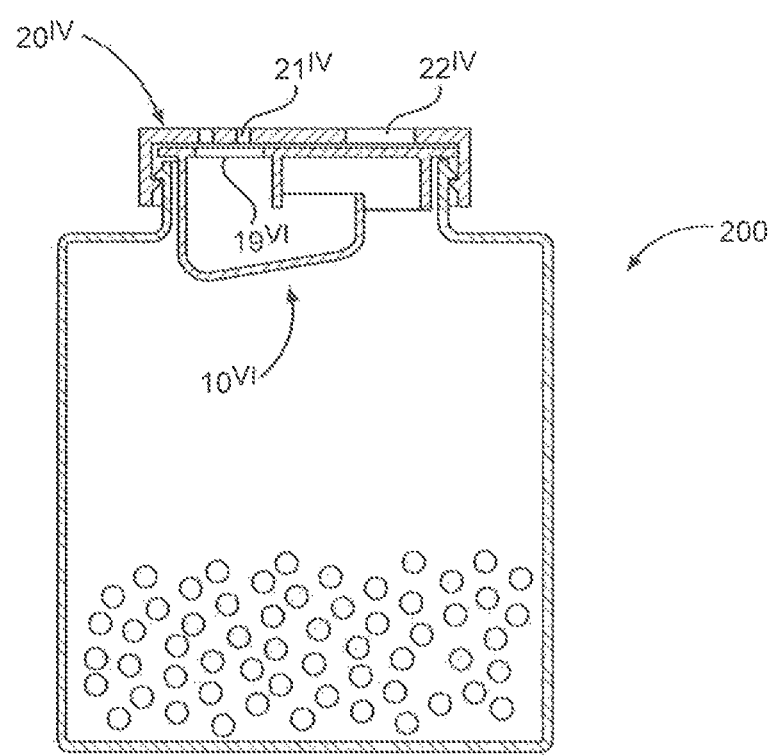
FIG. 26

FIG. 29
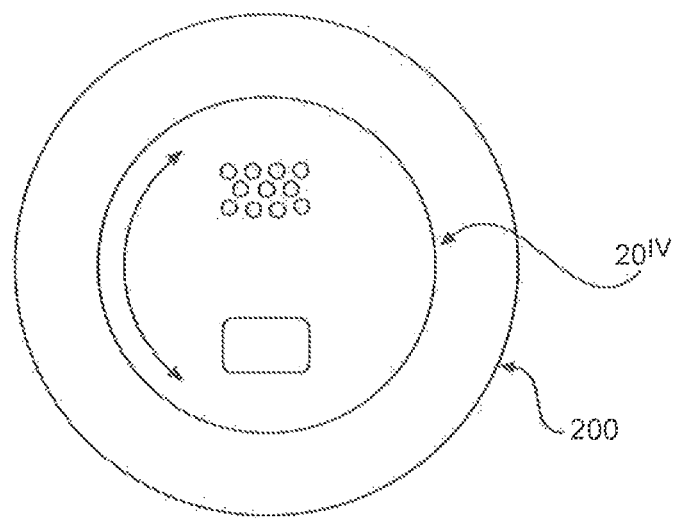
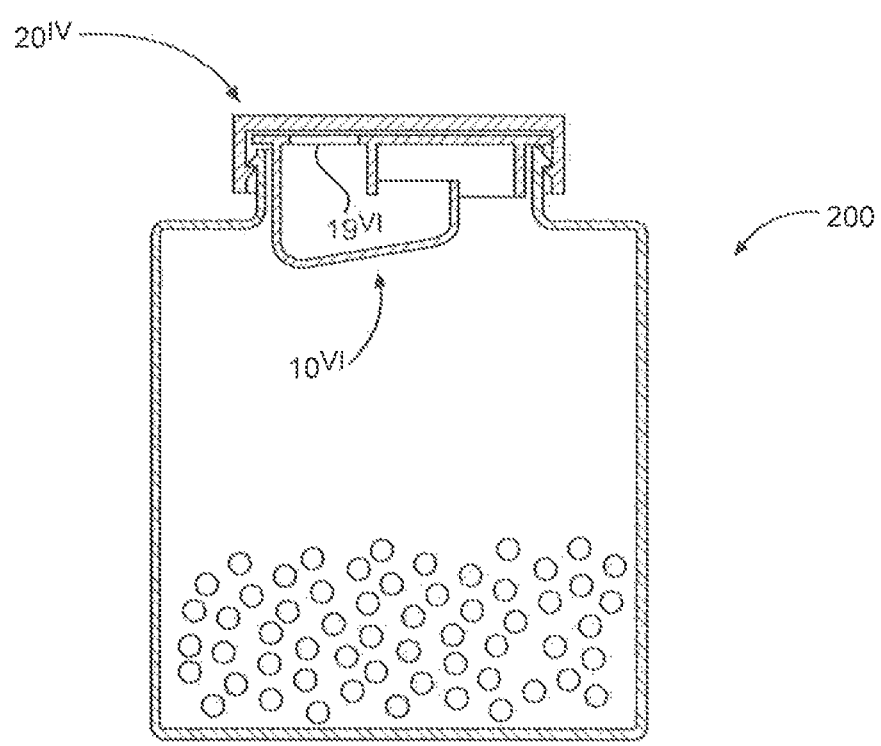
FIG. 28

DOSING CLOSURE AND CONTAINER UTILIZING THE SAME

CROSS-REFERENCE TO RELATED APPLICATIONS

The instant application is a US non-provisional Application claiming the benefit of U.S. provisional application No. 62/402,458 filed on Sep. 30, 2016, the disclosure of which is hereby expressly incorporated by reference thereto in its entirety.

BACKGROUND OF THE INVENTION

1. Field of the Invention

This invention relates generally to containers and closures which utilize capability and especially for foods which are either in liquid form or dry form such as granulated products, e.g., spices, and well as a method of making and using the same.

2. Discussion of Background Information

Dosing closures and containers utilizing the same are known. See, for example, US 2011/0163132 to MOREAU, U.S. Pat. No. 5,054,660 to SHERMAN et al, and U.S. Pat. No. 3,917,129 to CAVAZZA, the entire disclosures of each of which is herein incorporated by reference in its entirety.

However, existing or known dosing closures of containers utilizing the same lack one or more features utilized in the container, doser or combination disclosed herein.

SUMMARY OF THE INVENTION

According to one non-limiting embodiment of the invention, there is provided a doser for a container containing a substance, said doser comprising a dosing member configured to be located at least partially inside a dispensing end of a container. The dosing member comprises at least a bottom wall and a retaining wall and a retaining space of predetermined volume configured to retain a dispensable amount of said substance. When the doser is arranged on a container and the container dispenses the dispensable amount of said substance, the dosing member substantially prevents the substance contained in the container from passing into the retaining space.

In embodiments, the substance is a liquid.

In embodiments, the liquid is a drinkable or consumable liquid.

In embodiments, the substance is a particulate substance.

In embodiments, the particulate substance is one of a particulate material, a powder, a dry consumable material and a spice.

In embodiments, the predetermined volume comprises one of a teaspoon, a fraction of a teaspoon, a half teaspoon, a tablespoon, a fraction of a table spoon, and a half tablespoon.

In embodiments, the bottom wall is tapered, angled or pitched.

In embodiments, the retaining wall is configured to be spaced from an inside surface of the container so as to define a main substance passage.

In embodiments, an upper free end of the retaining wall is configured to be spaced from an inside surface of the container so as to define a substance introduction passage.

The invention also provides for a container comprising the doser of anyone of the types described above and a dispenser arranged above the doser and comprising at least one of plural sifting openings allowing passage therethrough the dispensable amount of said substance, a single pouring opening allowing passage there-through of the dispensable amount of said substance, a rotatable member having at least one opening allowing passage there-through the dispensable amount of said substance, and a disk having at least one opening allowing passage there-through the dispensable amount of said substance.

In embodiments, the container further comprises a cap or cover movable to a covering position overlying the doser.

The invention also provides for a doser for a container containing a liquid or particulate substance, wherein the doser comprises a dosing member configured to be located at least partially inside a container. The dosing member comprises at least a bottom wall, a separating wall and a retaining wall and being configured to contain and retain a dispensable dose of said substance. A user-movable dispenser member is arranged above the dosing member and comprising at least one dispensing opening.

The invention also provides for a doser assembly for a container containing a liquid or particulate substance, wherein the doser assembly comprises a dosing member configured to be located at least partially inside a container. The dosing member comprises at least a bottom wall, a separating wall and a retaining wall and being configured to contain and retain a dispensable dose of said substance. A dispenser member is arranged above the dosing member and comprising at least one dispensing opening. A cap or cover movable to a covering position overlying the dispenser member.

The invention also provides for a doser assembly for a container containing a liquid or particulate substance, wherein the doser assembly comprises a dosing member configured to be located at least partially inside a container. The dosing member comprises at least a bottom wall, a separating wall and a retaining wall and being configured to contain and retain a dispensable dose of said substance. A rotatable dispenser member is arranged above the dosing member and comprising plural sifting openings and a pouring opening. A cap or cover is movable to a covering position overlying the dispenser member.

The invention also provides for a container comprising the doser or doser assembly of anyone of the types described above.

The invention also provides for a container comprising a container containing a substance that is edible or food based and a doser assembly comprising a dosing member configured to be located at least partially inside a dispensing end of the container, said dosing member comprising at least a bottom wall, a separating wall and a retaining wall and being configured to contain and retain a dispensable amount of said substance, and at least one of a dispenser member arranged above the dosing member and comprising plural sifting openings and a pouring opening and a cap or cover movable to a covering position overlying the dispenser member.

In embodiments, the dosing member is a one-piece member.

In embodiments, the dosing member and the dispenser member are integrally formed.

In embodiments, the dosing member and the cap or cover are integrally formed.

In embodiments, the dosing member further comprises a retaining flange configured to retain the doser member on the dispensable end of the container.

The invention also provides for a container comprising a container comprising an open dispensing end and a doser assembly comprising a doser mounted to the dispensing end and being located at least partially inside the dispensing end of the container. The doser is configured to contain and retain a dispensable amount of said substance and comprising at least a bottom wall, a separating wall, a retaining wall and a dispensing wall comprising plural sifting openings and a pouring opening.

In embodiments, the doser is a two-piece member.

In embodiments, the doser is a one-piece member.

In embodiments, the dispensing wall is rotatable or disk-shaped.

The invention also provides for a doser for a container containing a substance, said doser comprising a container mounting portion, a bottom wall, a retaining wall, and a retaining space of a predetermined volume configured to retain a dispensable amount of said substance, wherein, when the doser is arranged on a container and the container dispenses the dispensable amount of said substance, the doser substantially prevents the substance contained in the container from passing into the retaining space.

The invention also provides for a doser for a container containing a substance, said doser comprising a container mounting portion configured to secure the doser to a dispensing end of the container, a wall comprising at least one dispensing opening, a bottom wall, a retaining wall, a separating wall spaced from the retaining wall, and a retaining space of a predetermined volume configured to retain a dispensable amount of said substance, wherein, when the doser is arranged on a container and the container dispenses the dispensable amount of said substance, the doser substantially prevents the substance contained in the container from passing into the retaining space.

The invention also provides for a doser for a container containing a substance, said doser comprising a container mounting portion configured to secure the doser to a dispensing end of the container, a wall comprising plural sifting openings and a pouring opening, a bottom wall, a retaining wall, a separating wall spaced from the retaining wall, and a retaining space of a predetermined volume configured to retain a dispensable amount of said substance, wherein, when the doser is arranged on a container and the container dispenses the dispensable amount of said substance, the doser substantially prevents the substance contained in the container from passing into the retaining space.

The invention also provides for a doser for a container containing a substance, said doser comprising a container mounting portion configured to secure the doser to a dispensing end of the container, a rotatable wall comprising plural sifting openings and a pouring opening, a bottom wall, a retaining wall, a separating wall spaced from the retaining wall and a retaining space of a predetermined volume configured to retain a dispensable amount of said substance, wherein, when the doser is arranged on a container and the container dispenses the dispensable amount of said substance, the doser substantially prevents the substance contained in the container from passing into the retaining space.

The invention also provides for a container comprising a container comprising a dispensing end and the doser of anyone of the types described above mounted to the dispensing end.

The invention also provides for a doser for a container containing a substance, said doser comprising a container mounting portion configured to secure the doser to a dispensing end of the container, a cap or cover coupled to the container mounting portion, a wall that can rotate relative to the container mounting portion, said wall comprising plural sifting openings and a pouring opening, a bottom wall, a retaining wall, a separating wall spaced from the retaining wall and a retaining space of a predetermined volume configured to retain a dispensable amount of said substance, wherein, when the doser is arranged on a container and the container dispenses the dispensable amount of said substance, the doser substantially prevents the substance contained in the container from passing into the retaining space.

The invention also provides for a container comprising a container comprising a dispensing end and the doser of the type described above mounted to the dispensing end.

The invention also provides for a method of dispensing a substance, wherein the method comprises tipping a container of anyone of the types described above so that some of the substance enters the retaining space, moving the container back to a substantially original or upright position, and tipping the container again so that the substance located in the retaining space is dispensed from the container while the substance disposed inside the container and outside the retaining space is prevented from being dispensed.

In exemplary embodiments, any of the above-noted embodiments may include one or more of the following features:

A hinged flip top covering for the dosing mechanism allowing the bottle or container to be snapped shut which can keep the product fresher longer.

The closure includes an integrated dosing mechanism which allows the closure/doser to be made with fewer parts or components.

A sifter pattern can be arranged on a top of the dosing aperture which allows for sprinkling product out of the dosing mechanism.

A ½ covered and ½ open hole sifter pattern can be utilized to allow for both sprinkle and direct dose. This can be integrated into a single piece member or a dial disc.

The container can have the form of a bottle which includes a special or unique neck configuration or diameter which allows for the dosing mechanism to be fully inserted into the bottle which allows for sealing to be located on a top most surface of the container.

A raised perimeter sealing ring may be utilized on the dosing mechanism that acts as a sealing surface. This can engage with a recessed or flat surface of the bottle or container so provide a freshness seal.

The doser may utilize a dose of a specific small quantity to be dosed per cycle. If, for example, the dose is a half-teaspoon, a user can accurately dispense 2 teaspoons by using four cycles.

The doser can also utilize doser adjustment by either changing the physical size of the available pocket that captures the ingredients or setting the same to deliver a range of dose. This can be achieved through a rotational change mechanism or through a height change of the dosing mechanism.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The figures are intended to show basic features, functioning and aid in understanding and may or may not show features or details which are utilized in commercial embodiments.

FIG. 13 shows a top perspective view of a top portion of a container package according to an embodiment of the invention. This cover shown in FIG. 13 can be installed on either of the embodiments of FIGS. 11 and 13;

FIG. 15 shows the cap in an installed covering state and FIG. 16 shows the cap in a removed uncovering state;

FIG. 18 shows a cross-section view of a container package according to another embodiment of the invention;

FIG. 19 shows a top view of the container package of FIG. 18;

FIG. 20 shows a top view of the container package of FIG. 18 but with the disk rotated to a pouring position, i.e., a position wherein the pouring opening of the disk is aligned with a dispensing opening of the doser;

FIG. 21 shows a top view of the container package of FIG. 18 but with the disk rotated to a slit or sifting position, i.e., a position wherein the sifting openings of the disk are aligned with a dispensing opening of the doser;

FIG. 22 shows the container package of FIG. 18 in a disassembled state;

FIG. 23 shows an enlarged portion of the container package similar to that of FIG. 18 and illustrates a position for locating a mechanism or retaining arrangement that retains the closure assembly on the container neck;

FIG. 23A shows an enlarged view of a portion of FIG. 23;

FIG. 24 shows a cross-section view of a container package according to another embodiment of the invention;

FIG. 25 shows a top view of the container package of FIG. 24;

FIG. 26 shows the container package of FIG. 24 with the cap rotated to a sift dispensing position;

FIG. 27 shows a top view of the container package of FIG. 26;

FIG. 28 shows the container package of FIG. 24 with the cap rotated to a closed or non-dispensing position;

FIG. 29 shows a top view of the container package of FIG. 28;

DETAILED DESCRIPTION OF THE INVENTION

Figure 1:
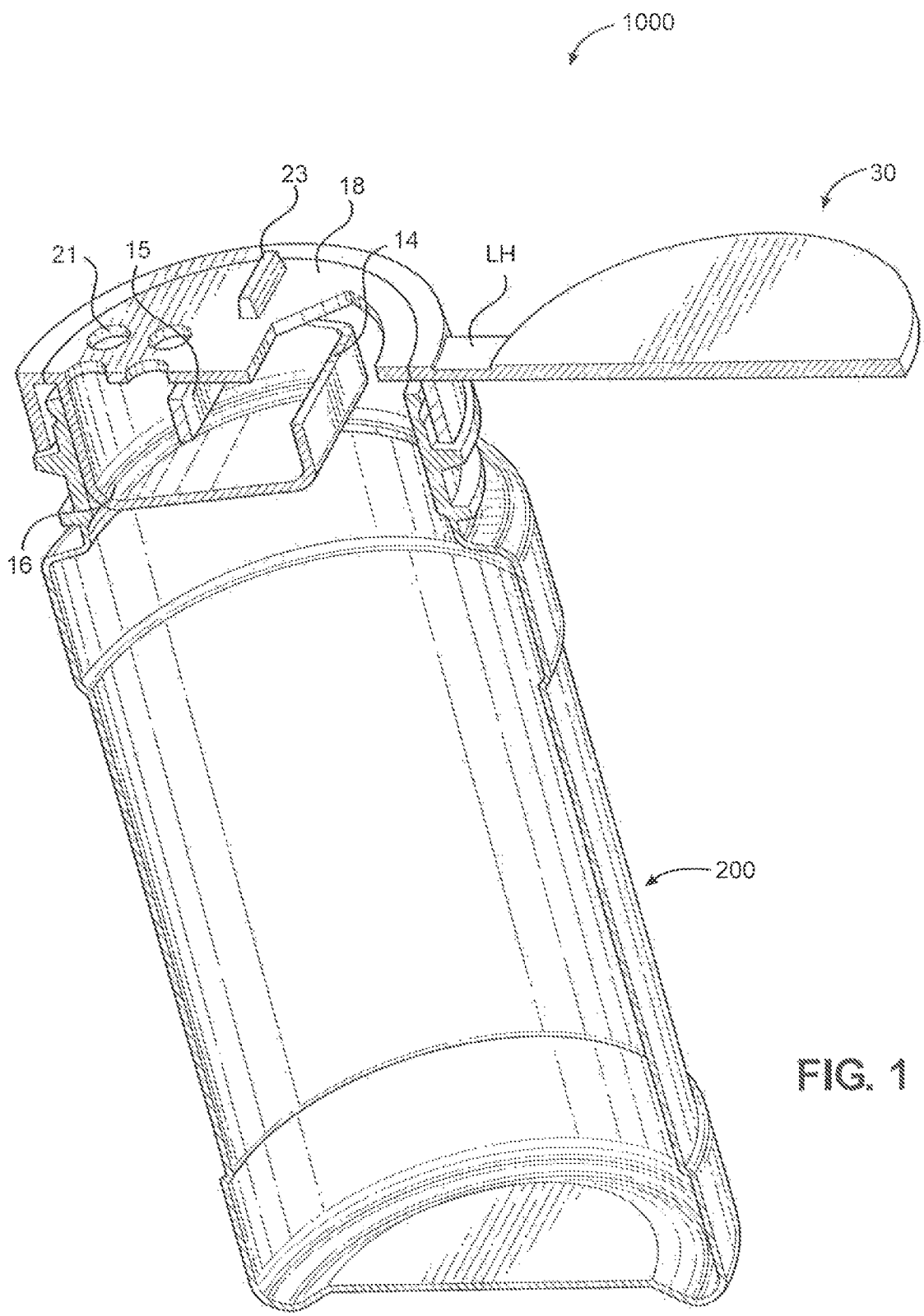
FIG. 1 shows a cross-section view of a container package having a doser closure according to one embodiment of the invention and shows a covering or cap in an open position.
Figure 2:
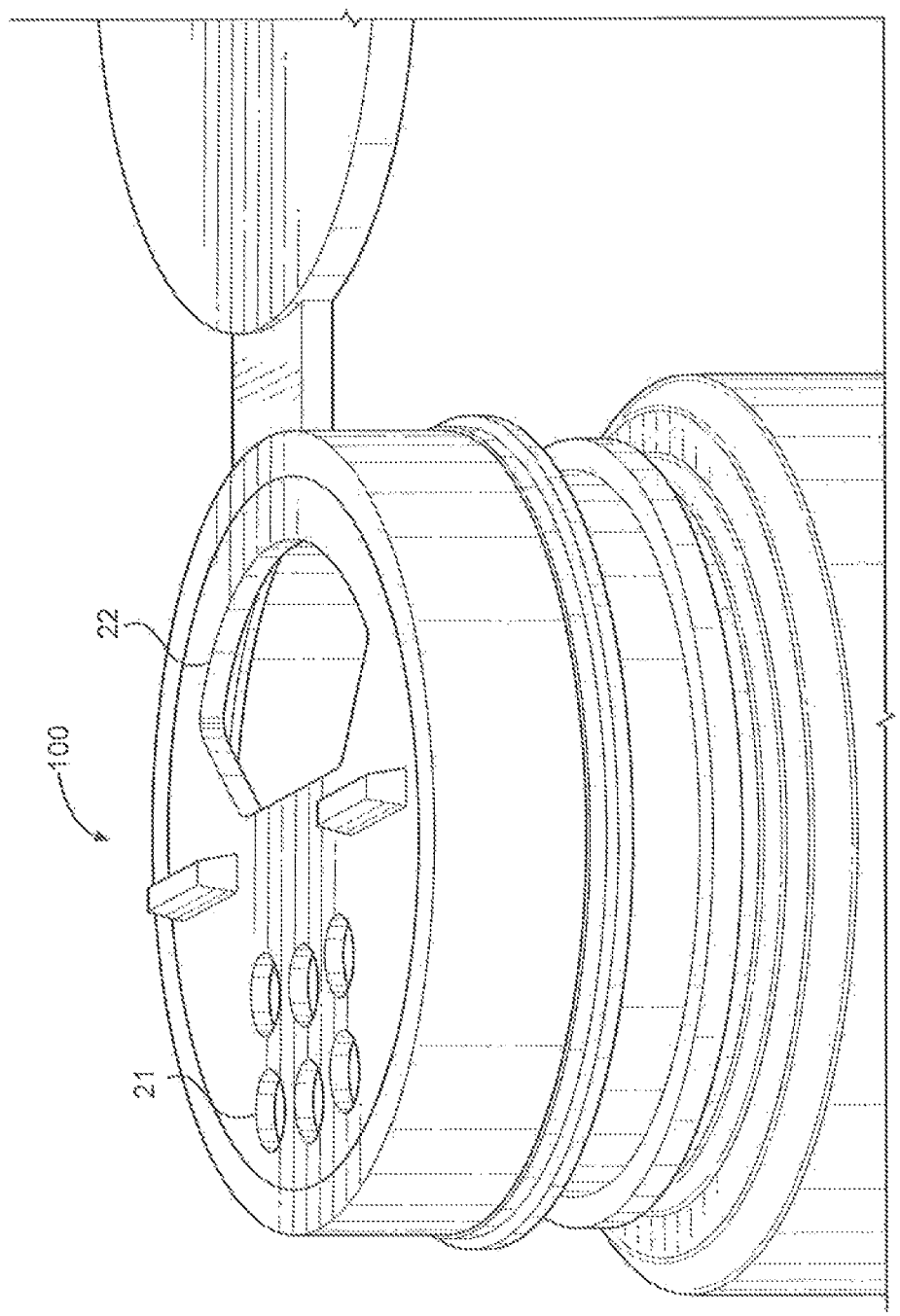
FIG. 2 shows an enlarged view of a top portion of the container package of FIG. 1.
Figure 3:
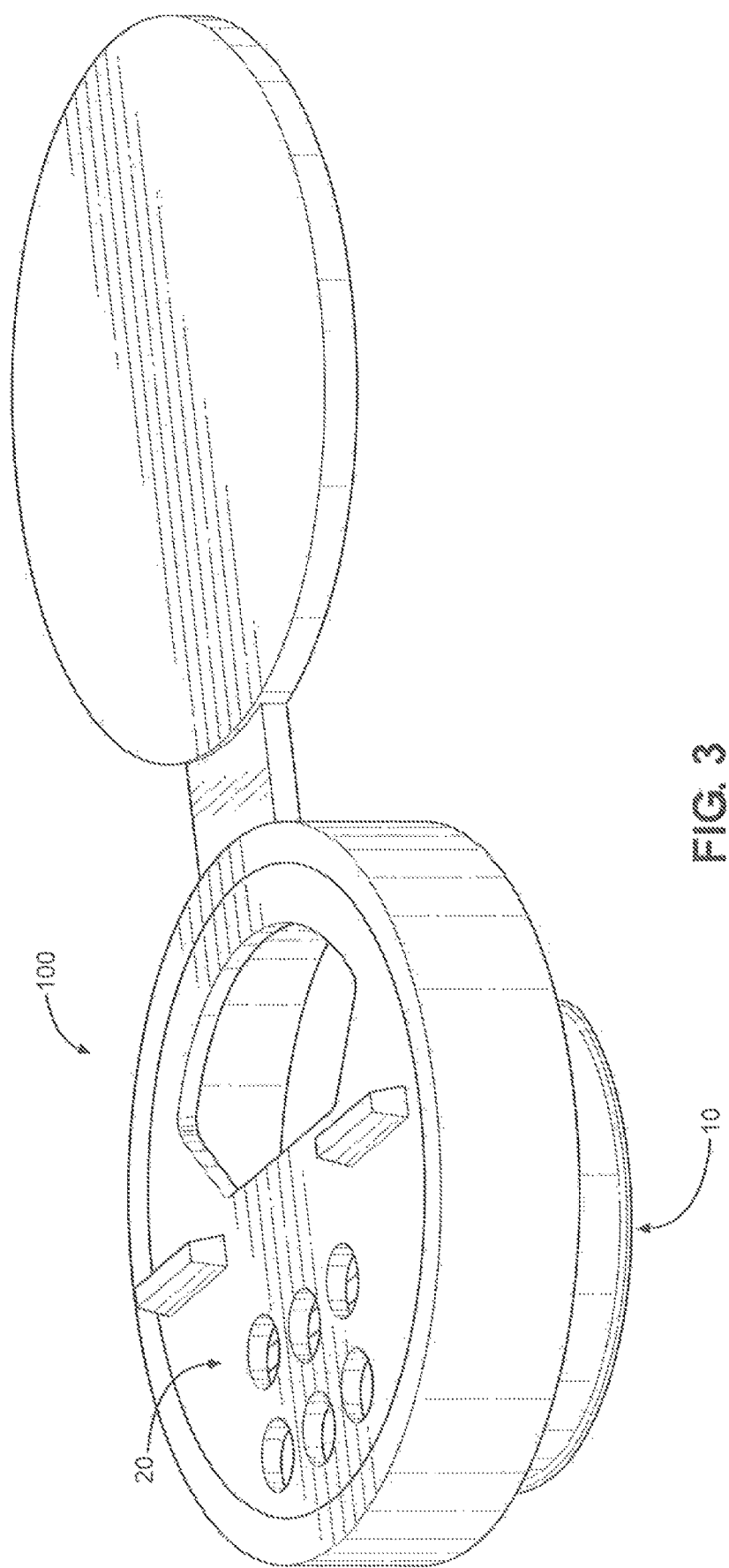
FIG. 3 shows a perspective view of the doser assembly used on the container package of FIG. 1.
Figure 4:
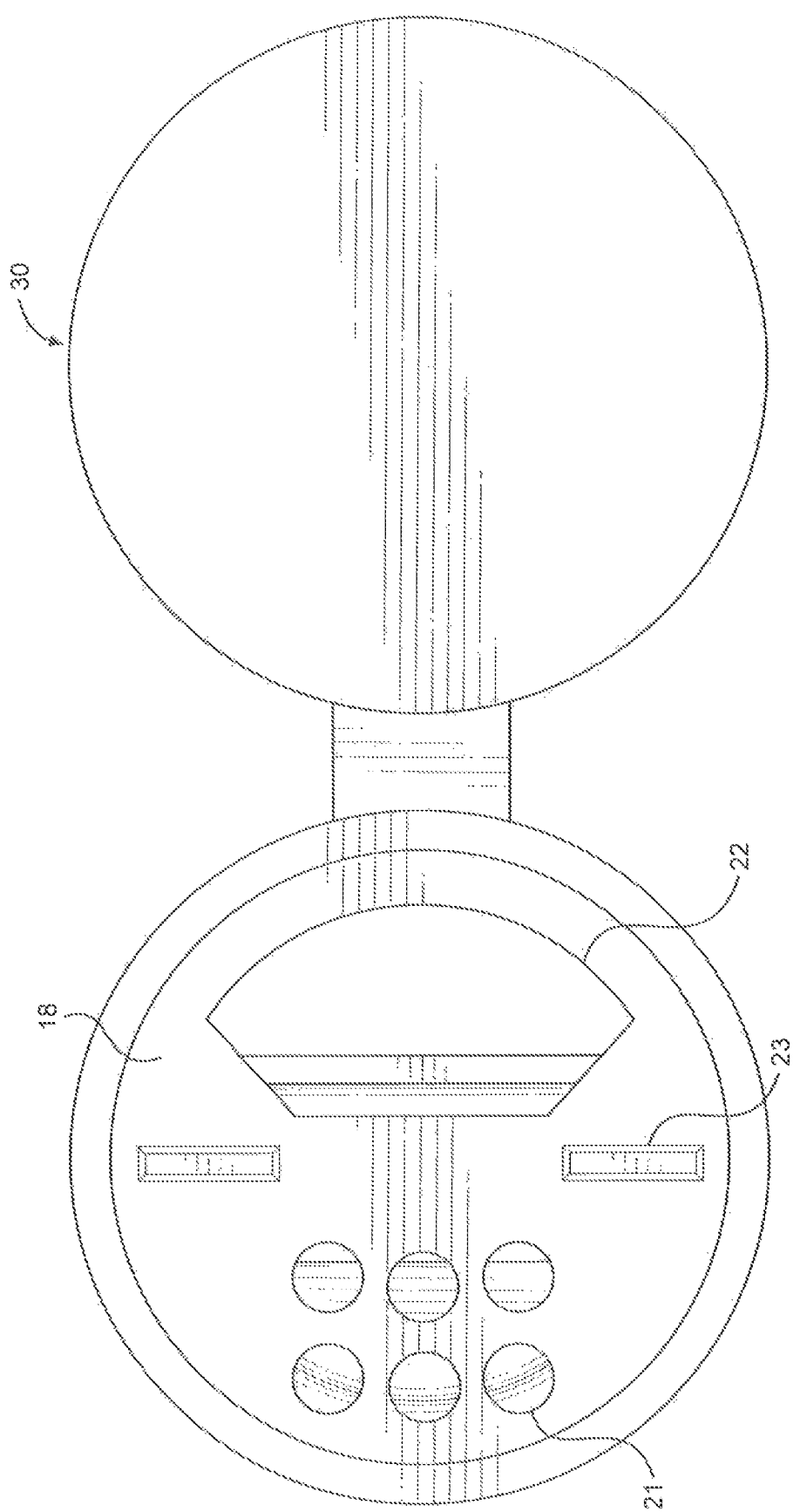
FIG. 4 shows a top view of the doser assembly of FIG. 3.
Figure 5:
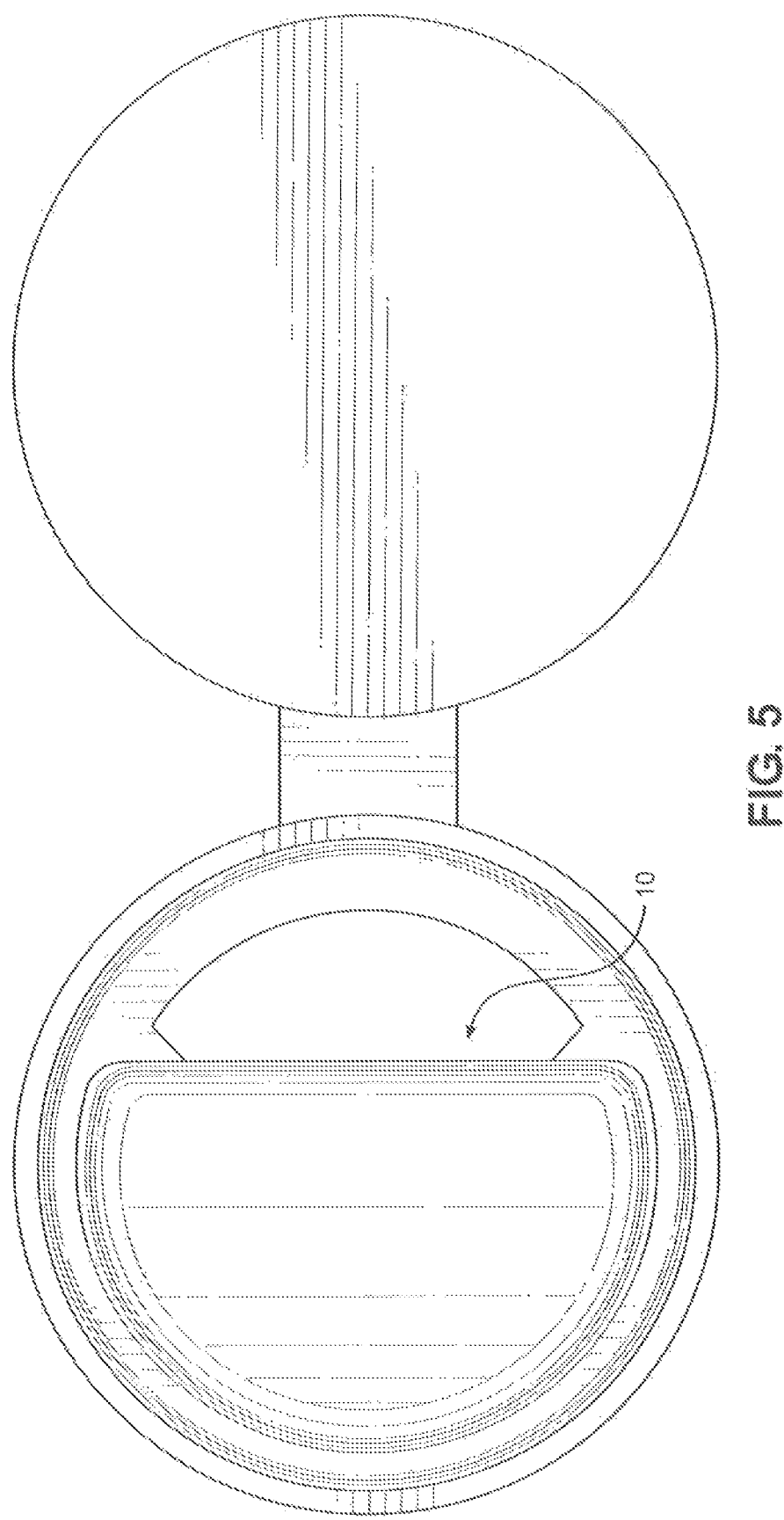
FIG. 5 shows a bottom view of the doser assembly of FIG. 3.
Figure 6:
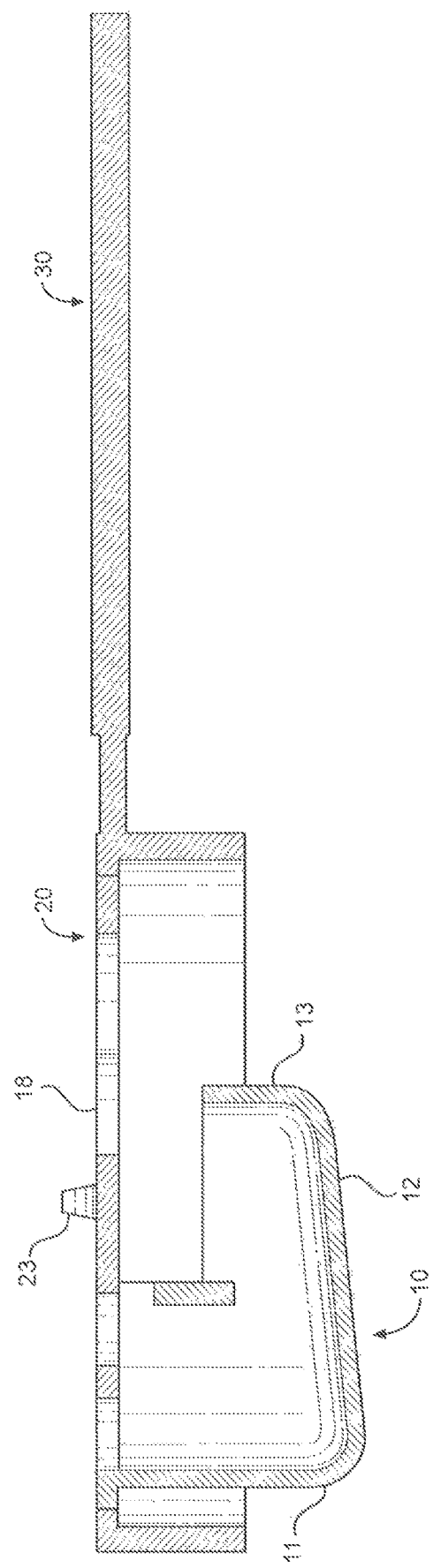
FIG. 6 shows a cross-section view of the doser assembly of FIG. 3.

The present invention is further described in the detailed description which follows, in reference to exemplary embodiments.

Non-Limiting Examples

With reference to FIGS. 1-6, there is shown a granulated product container package 1000 includes a generally cylindrical container body 200 that can have a volume of between, e.g., 1 and 32 ounces and a doser 100. The container 200, in embodiments, has a closed bottom, one or more sides and an open upper end that may be located in a narrower container neck region. In one exemplary embodiment, the container 200 is a one-piece glass or synthetic resin member that is food-grade material. The container package 1000 can containing a substance, e.g. particulate substance S. Although designed for particulate substances, the package 1000 can also be used to dispense liquids. The doser 100 comprises a dosing body or member 10 configured to be located at least partially inside a dispensing end or neck of the container 200. The dosing body or member 10 comprises at least a bottom wall 12 and a retaining wall 13 and a retaining space 16 of predetermined volume configured to retain a dispensable amount of said substance. When the doser 100 is arranged on a container 200 and the container dispenses the dispensable amount of the substance, the dosing member 10 substantially prevents the substance contained in the container from passing into the retaining space 16. A separating wall 15 extends down from an upper wall 18 and separates a dispensing volume from a receiving opening 17. An upper wall 18 includes projections 23 by which a user or consumer can rotate the doser 100 relative to the container 200. In addition, the wall 18 has sifting openings 21 that all the contents of the doser 100 to be dispensed and a main opening 22 that allows the substance to be dispensed by pouring out (bypassing the doser 100). A cover 30 (shown schematically) can be moved to a position cover the doser 100 and is attached to a living hinge LH. Although not shown in FIGS. 1-6, the doser 100 can be configured so that the upper wall 18 instead has the form of a rotating disk 20 (see position shown in FIG. 3) whose rotation would be facilitated by the projections 23 and allow the disk 20 to rotate relative to the member 10. As will be illustrated in other embodiments described herein, this can allow the positioning of a pouring opening or sifting openings over a dispensing opening of the member 10. In one exemplary embodiment of FIGS. 1-6, the member 10 is a one-piece synthetic resin member that is of food-grade material.

Figure 7:
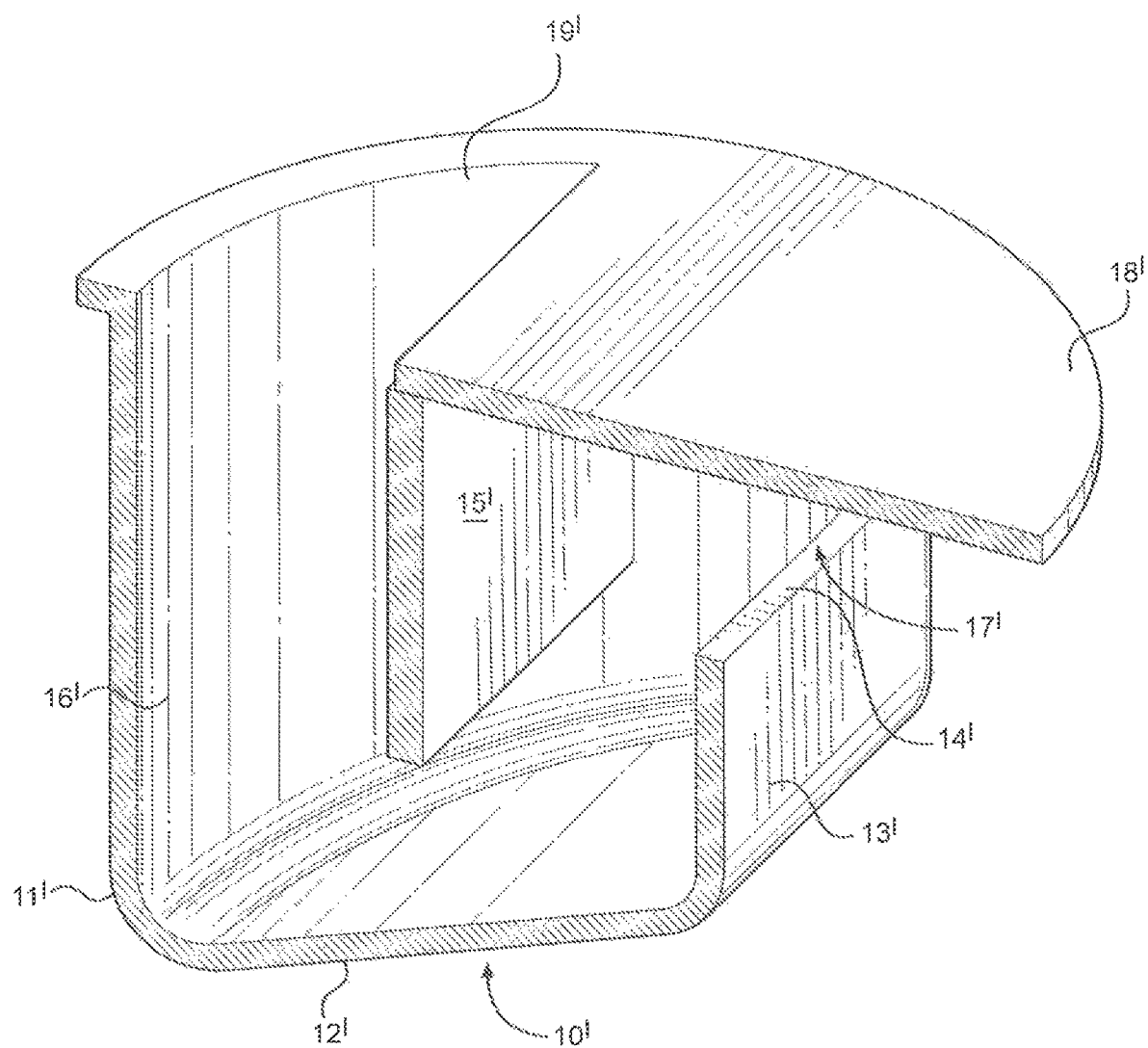
FIG. 7 shows a cross-section view of a doser according to another embodiment of the invention.
Figure 8:
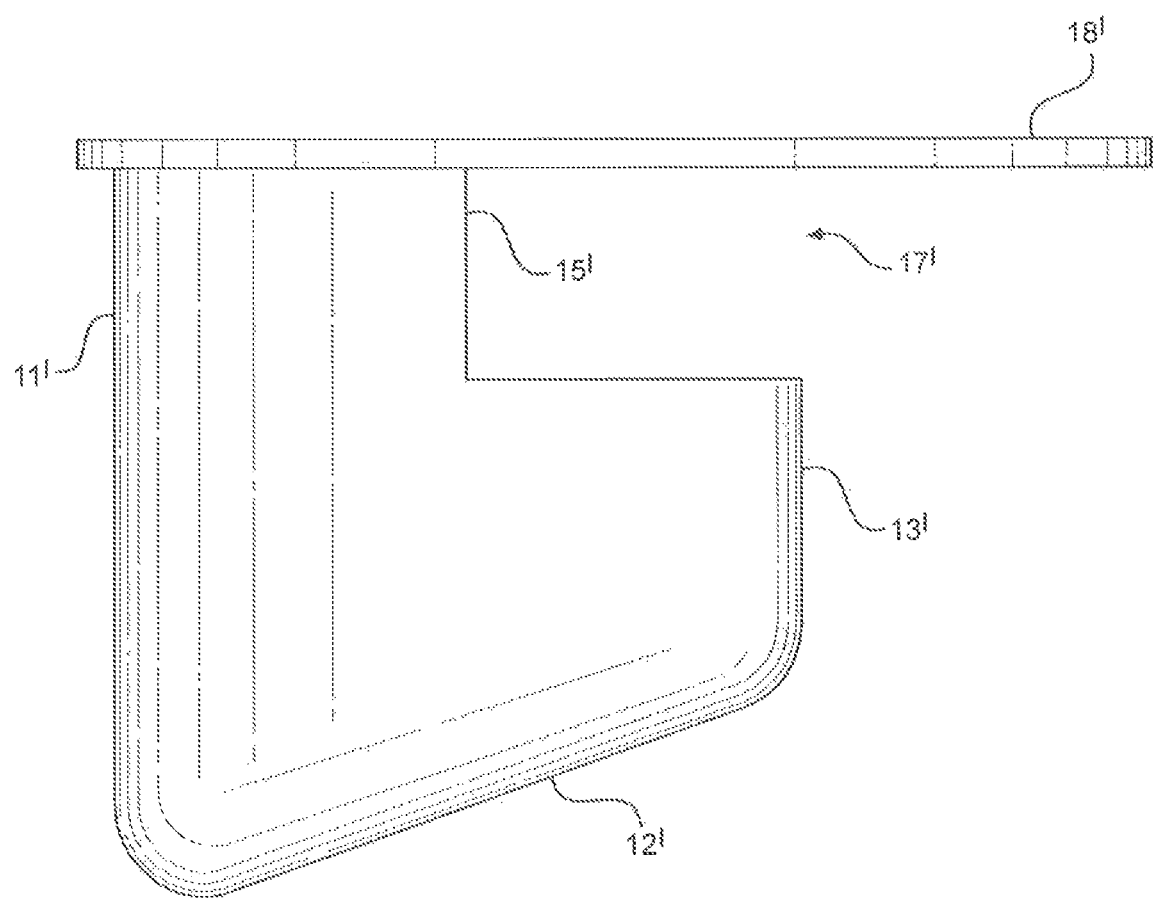
FIG. 8 shows a side view of the doser of FIG. 7.
Figure 9:
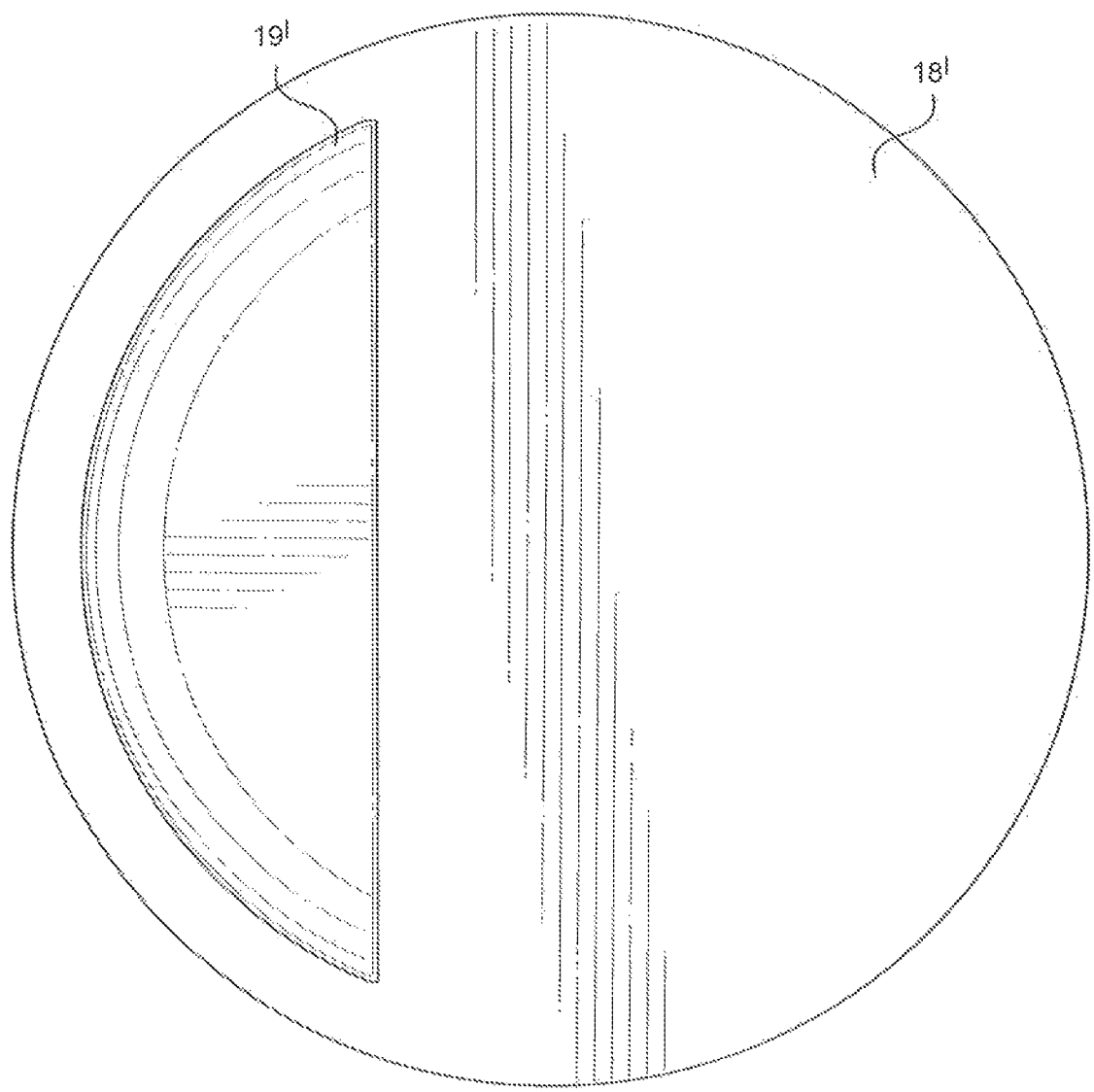
FIG. 9 shows a top view of the doser of FIG. 7.
Figure 10:
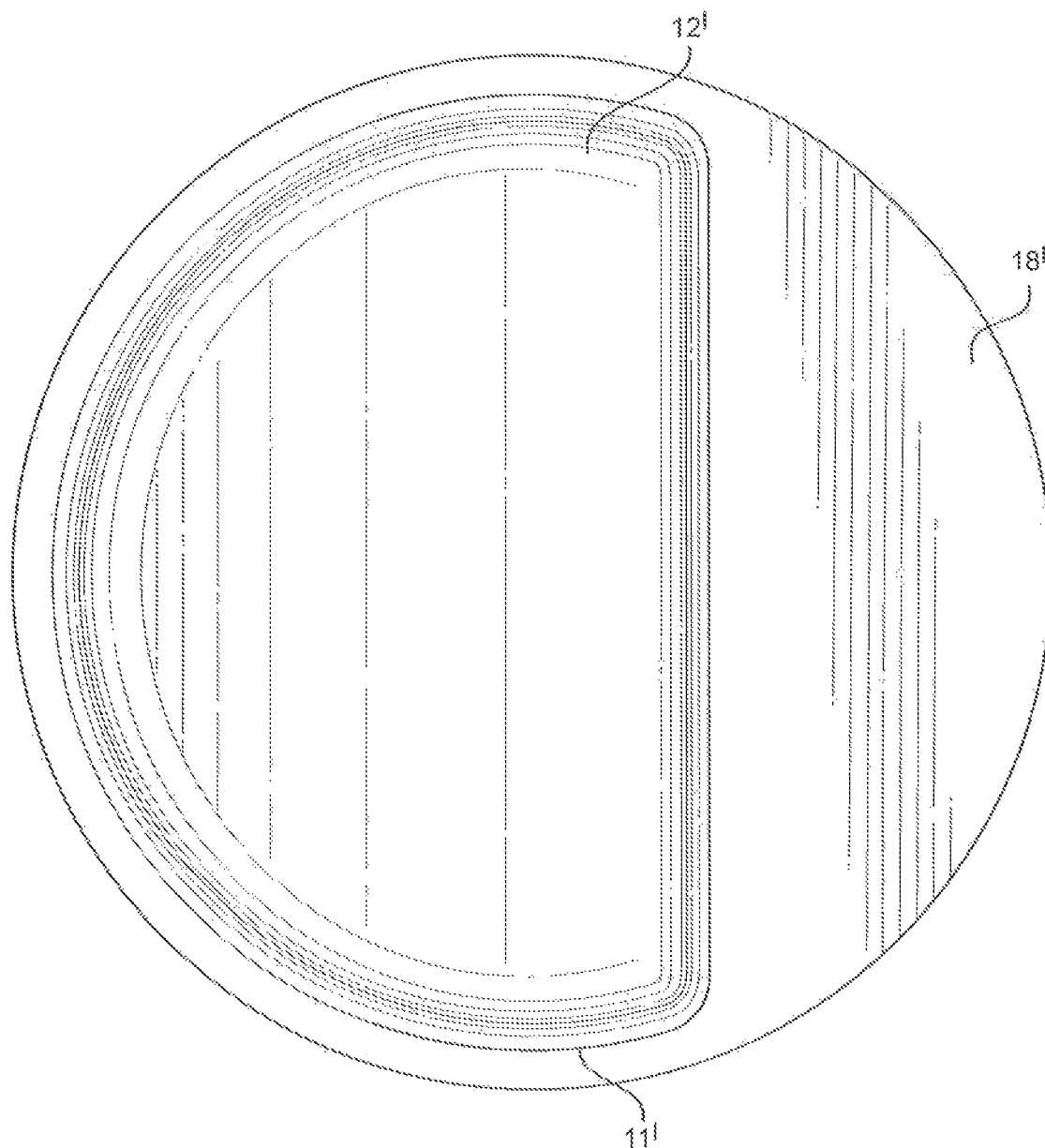
FIG. 10 shows a bottom view of the doser of FIG. 7.

With reference to FIGS. 7-10, there is shown another embodiment of a doser body 10'. The doser member 10' can be installed on a container such as container body 200 shown in FIG. 1. The doser member 10' comprises at least a semi-cylindrical vertical side wall 11', an angled bottom wall 12', and a generally vertical retaining wall 13'. The bottom wall 12' is angled such that a dispensable substance disposed in an internal space 16' will flow down or settle toward a direction of the wall 11'. As should be apparent, the wall 11' extends from the bottom wall 12' to an upper wall 18'. The upper wall 18' is shaped and sized to slid into an open end of a container, and, in this example, is generally circular. In addition, the wall 18" is sized to be larger than the container opening so that an outer circumferential portion thereof forms a flange that sits atop of the container opening rim (as is illustrated in with respect to other embodiments discussed later on). The shape of the vertical wall 11' also functions to properly located and center the member 10' inside the container opening. The member 10' also utilizes a vertical separating wall 15' which extends down from the wall 18' and whose bottom free end is lower than an upper end 14' of the wall 13'. As should be apparent from FIGS. 7 and 8, the upper end 14' of the wall is spaced from the wall 18' so as to define an entrance opening or gap 17' that allows the substance stored inside a container to enter into the member 10'. Also apparent from FIGS. 7 and 9, is that the wall 18' contains a dispensing opening 19'. Although the functioning of the doser 10' will be apparent later on, one should appreciate that the doser member 10' has an internal volume space 16' that is interrupted by the wall 15'. The space 16' between the wall 11' and the wall 15' is in direct communication with the dispensing opening 19' whereas the space between the wall 13' and the wall 15' is not in direct communication with the dispensing opening 19' but is instead in direct communication with opening 17'. These openings 17' and 19' have different functions, with the opening 17' serving to allow a container substance to enter into the space 16; whereas the opening 19' allows any substance disposed inside space 16' to exit from the doser member 10'. The doser member 10' can be a one-piece member made of food grade plastic.

Figure 11:
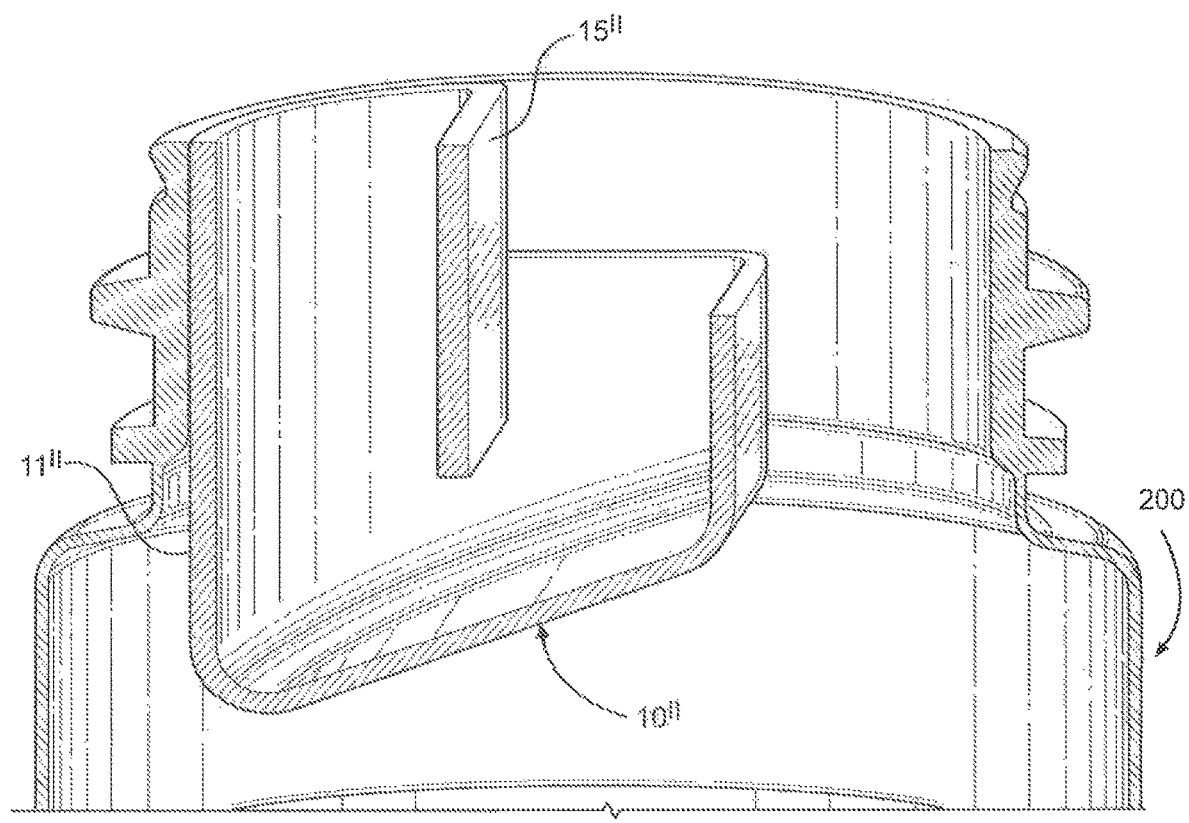
FIG. 11 shows a cross-section view of a top portion of a container package according to another embodiment of the invention.
Figure 12:
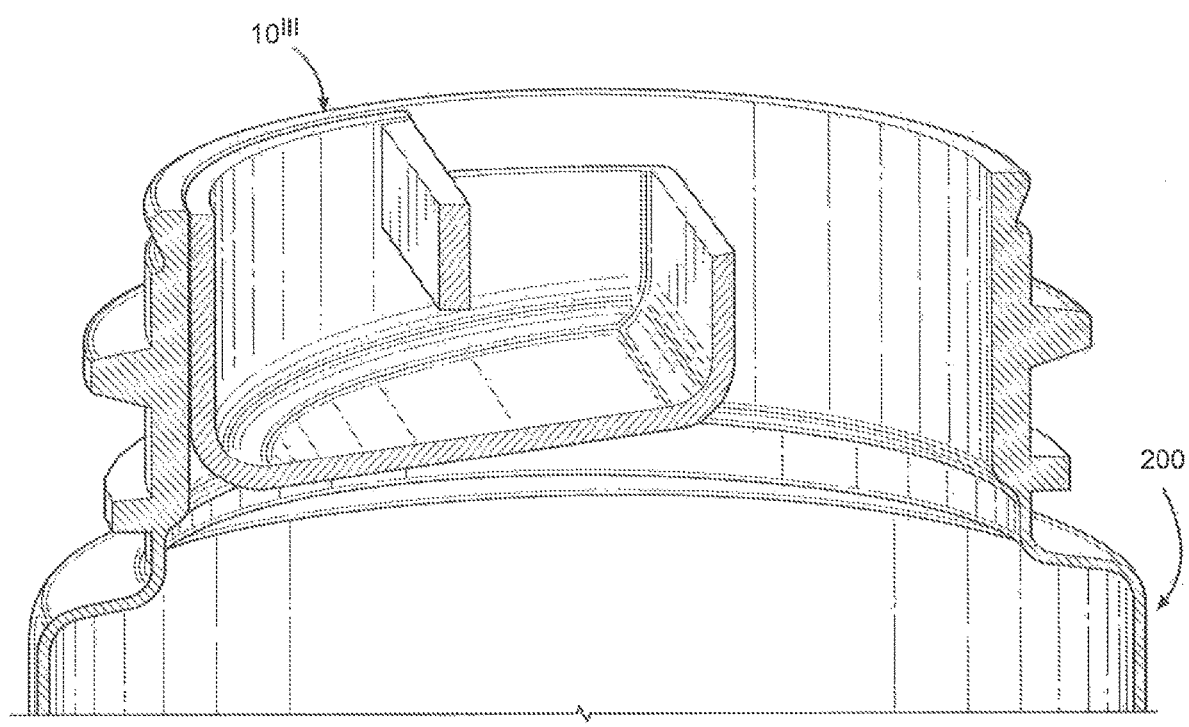
FIG. 12 shows a cross-section view of a top portion of a container package according to another embodiment of the invention.

With reference to FIG. 11, there is shown another embodiment of a doser body 10" arranged on a container 200. The doser member 10" is installed inside the open end of the container body 200. The doser member 10" is similar to the previous embodiment except that it does not utilize a upper wall 18' and instead has an open upper end as shown in FIG. 11. As a result, the vertical separating wall 15" is not connected at an upper end. Although not shown, the member 10" can be axially retained inside the container 200 via a snap engagement, adhesive or ultrasonic welding, etc. between the wall 11" and an inside surface of the container 200. As the member 10" uses features similar to the previous embodiment, there are not further discussed herein With reference to FIG. 12, there is shown another embodiment of a doser body 10''' arranged on a container 200. The doser member 10''' is installed inside the open end of the container body 200 as in the previous embodiment. The doser member 10''' is similar to the previous embodiment except that it is of shallower axial depth and therefore can dispense a lower volume of dispensable substance.

With reference to FIG. 13, there is shown an embodiment of a container package 1000 which utilizes a dispensing cap 20' having an integrally formed cover 30'. The doser member can be of either type shown in FIG. 11 or 12. In this embodiment, the member 20' has sift openings 22' that allow the substance disposed in the doser to be sifted out during dispensing. When the package 1000 is not being used, a user or consumer can flip the cover 30' to a closed position overlying the cap 20'. Although not shown, the cover 30' can be retained in the closed position by, among other things, one or more projections engaging with the sift openings 22'. This retaining engagement would also seal off the openings 22' and prevent any substances from leaking out of the openings 22'.

Figure 14A:
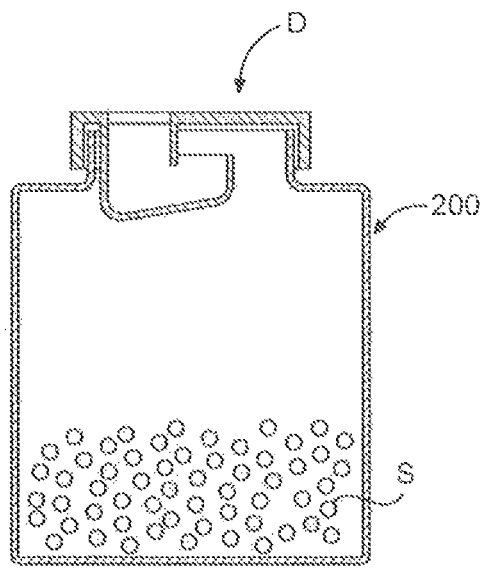
FIGS. 14A-14D schematically shows an exemplary container having a doser in various positions that illustrate how the doser generally functions between an original position and a substance dispensing position.
Figure 14B:
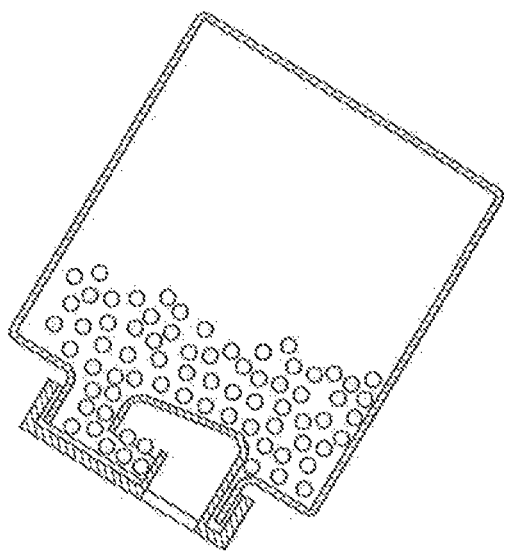
Figure 14C:
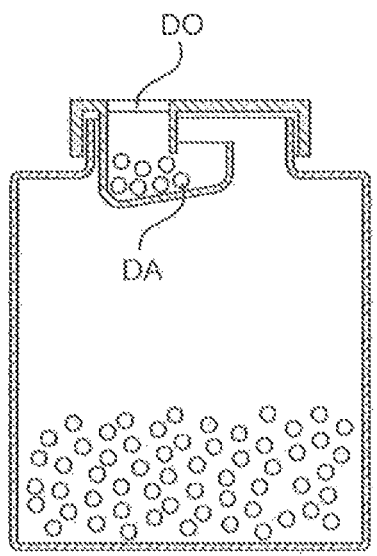
Figure 14D:
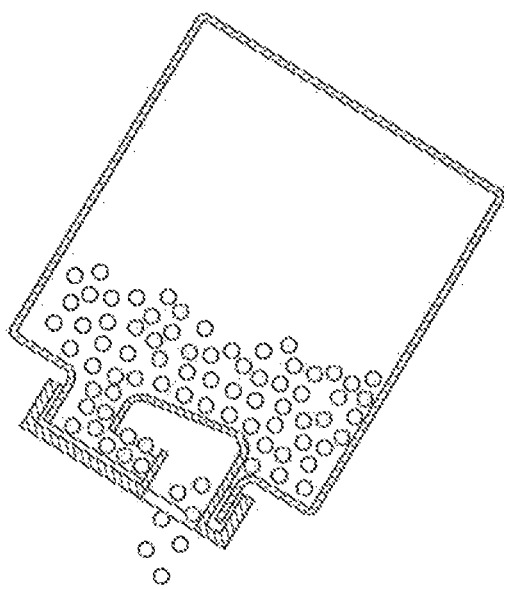

With reference to FIGS. 14A-14D, there is shown how the inventive doser functions in principle. An exemplary container 200 having a doser D can dispense a substance S container in the container 200. In the position shown in FIG. 14A, the doser D is shown installed on a container 200 containing a substance S. As expected, with the container 200 in a normal upright position, the substance S settles to the container bottom. To dispense a predetermined amount (or dose) of the substance S, a user or consumer grips the package container in his/her hand, needs to initially rotate the container to a substantially inverted position as shown in FIG. 14B. When this occurs, some of the substance S will pass into the doser D as shown in FIG. 14A. Indeed, when the user or consumer then rotates the container 200 to a substantially upright position as shown in FIG. 14C, one can see that the substance which passed into the doser in FIG. 14B has now settled into a space inside the doser D. This predetermined amount of substance can thus be characterized as a dispensable amount DA. In a final step for dispensing the dispensable amount DA (or dose), the user or consumer need only rotate the container to a substantially inverted position as shown in FIG. 14D. This will allow dispensing of only that which was inside the doser D—which exits from the dispensing opening DO. One should note that in the inverted position of FIG. 14D, some of the substance S will enter into the doser D during the dispensing. However, owing to the configuration of the doser D, only the dispensable amount DA will be dispensed, but advantageously, the dispensing position of FIG. 14D also results in doser D becoming charged with another dose D, as was the case in FIG. 14B.

Figure 15:
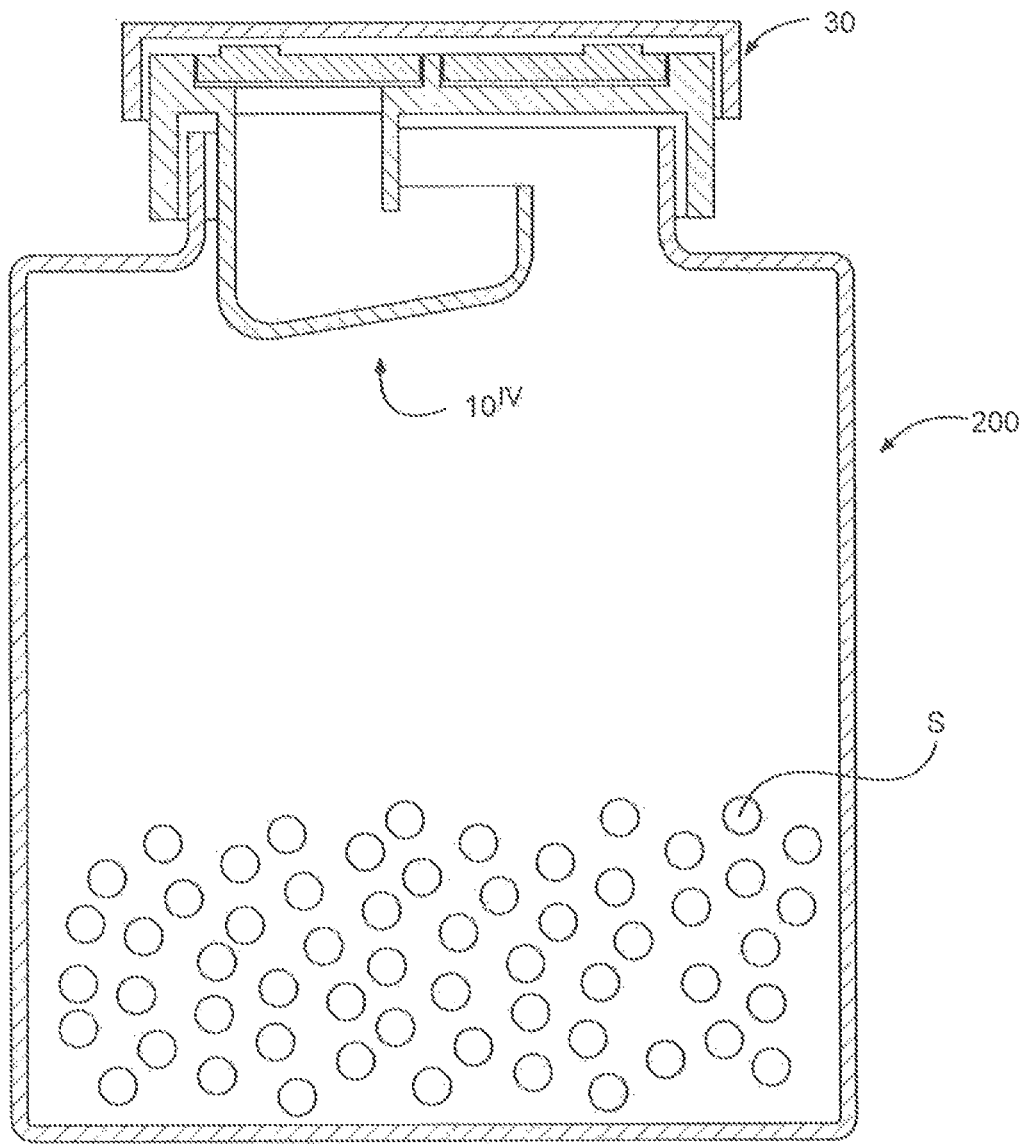
FIGS. 15 and 16 show cross-sections of an exemplary container package and closure combination having a removable cap that can be axially arranged over a rotatable dispensing disc and capable of being in sealing engagement with the doser closure.
Figure 16:
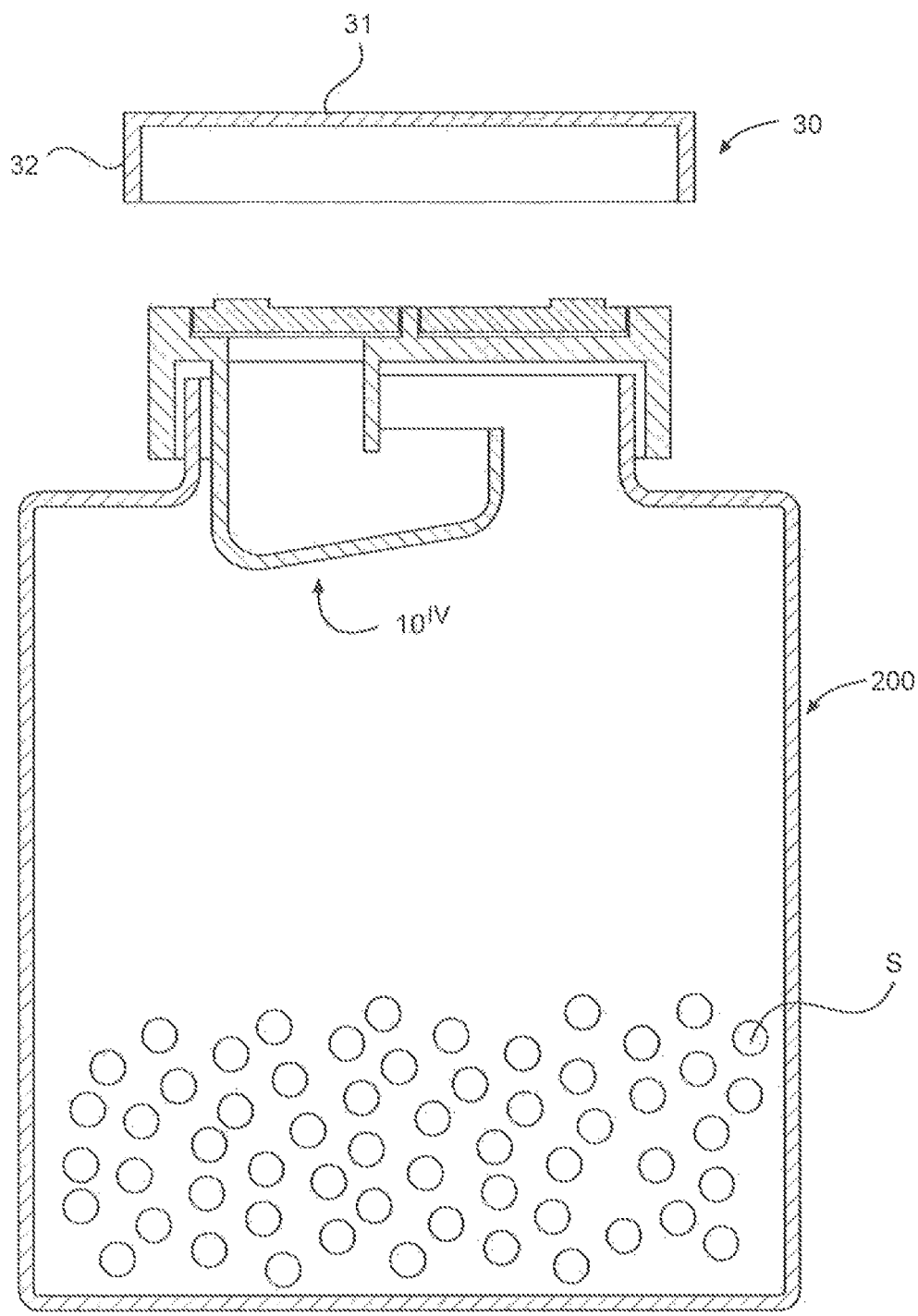

With reference to FIGS. 15 and 16, there is shown another embodiment of an inventive doser $10^{IV}$ mounted to a container 200 containing a dispensable substance S. In this embodiment, a covering or cap 30 is mounted to the doser $10^{IV}$ and can be removed and reinstalled as needed. In the installed position shown in FIG. 15, the covering 30 has been slid onto the doser $10^{IV}$. In this position, the container package can be stored for later use while the doser $10^{IV}$ remains protected from, among other things, collecting dust. When a user or consumer desires to use the container package, they need only remove (lift or slide off) the covering 30 to expose the doser $10^{IV}$. The covering 30 has a closed circular planar surface 31 and a circumferential or ring-shaped sidewall 32 that can sealing/frictionally engage with an outer circumferential surface of the doser $10^{IV}$. The covering 30 can be a one-piece member made of food grade plastic.

Figure 17:
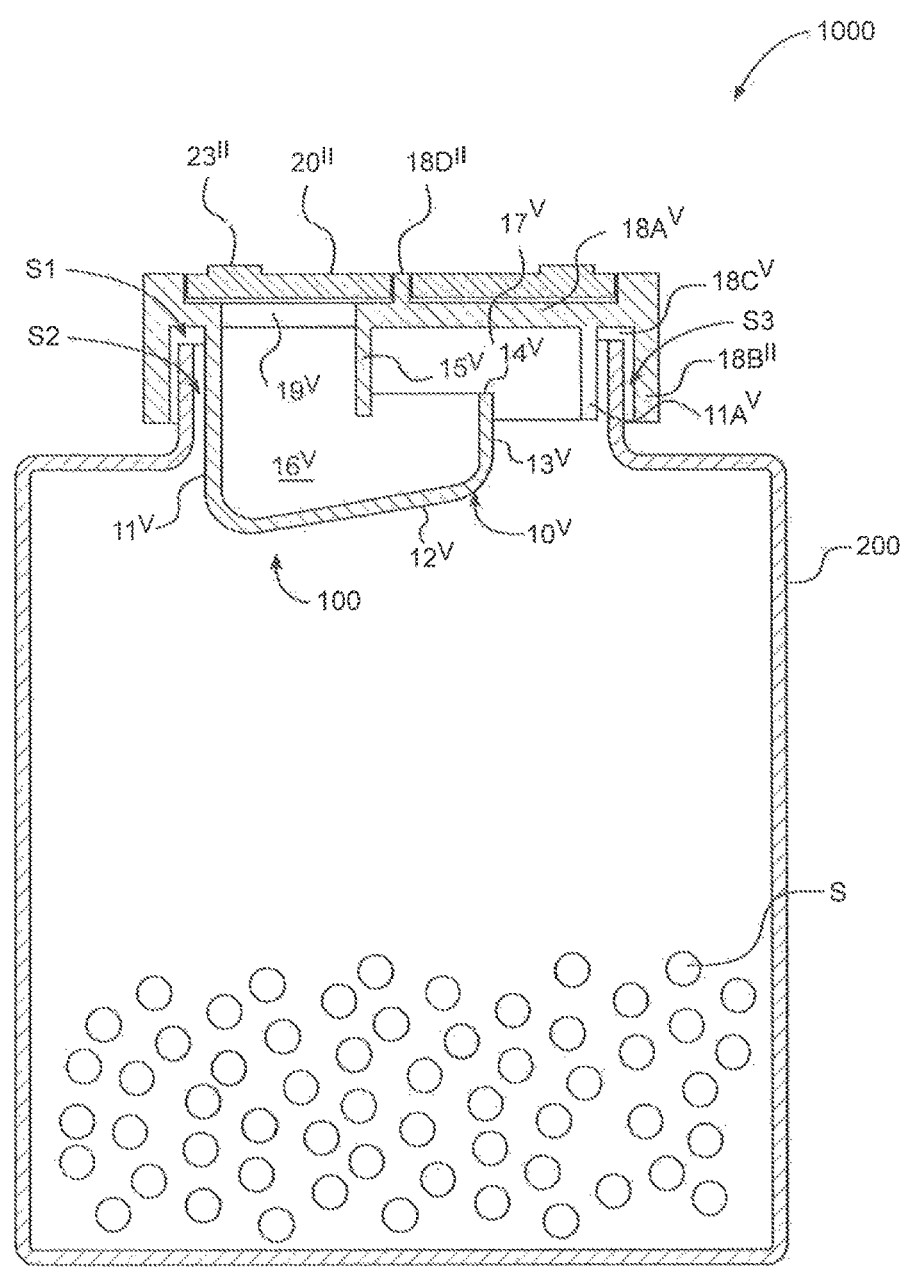
FIG. 17 shows an enlarged view of the container package according to another embodiment of the invention.
Figure 30:
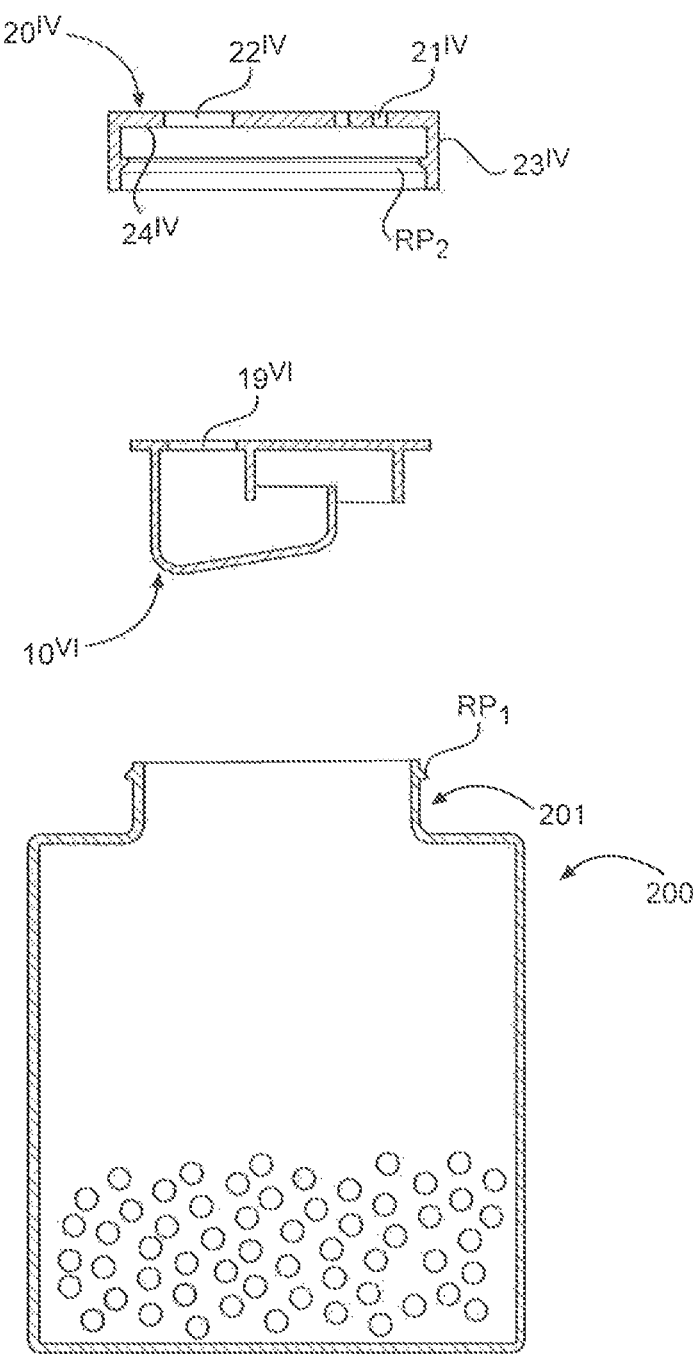
FIG. 30 shows the container package of FIG. 24 in a disassembled state.
Figure 31:
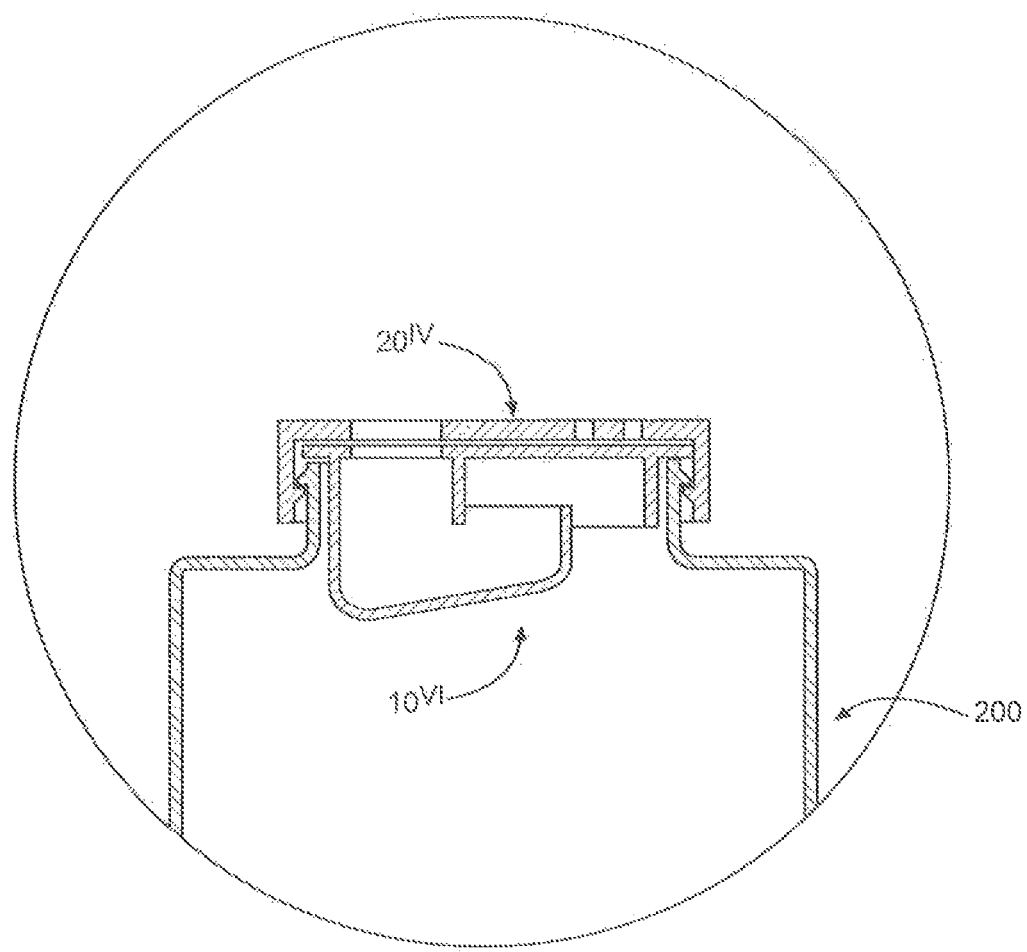
FIG. 31 shows an enlarged portion of the container package of FIG. 24 and illustrates more clearly the retaining arrangement that retains the cover on the container neck.

With reference to FIG. 17, there is shown another embodiment of a doser $10^V$. As with previous embodiments, the doser $10^V$ can be installed on a container 200. The doser $10^V$ comprises a cylindrical vertical side wall $11^V$ that extends all the way around via wall $11A^V$ so as to abut the container neck. A spaced between circumferential surfaces of these elements can be used to locate a seal S2 or sealing ring or projection (not shown). A bottom wall $12^V$ is angled such that a dispensable substance disposed in an internal space $16^V$ will flow down or settle toward a direction of the wall $11^V$. As should be apparent, the wall $11^V$ extends from the bottom wall $12^V$ to an upper wall $18^V$. The upper wall $18^V$ includes a ring-shaped space $18C^V$ that is shaped and sized to slid onto an open end of a container, and, in this example, is generally circular. In addition, the space $18C^V$ is sized to be larger than the container opening so that an outer circumferential portion thereof forms a flange that sits atop of the container opening rim. The spaced $18C^V$ is defined by circumferential surfaces which can be used to locate a seal S3 or sealing ring or projection (not shown). Alternatively or additionally, a seal S3 or sealing ring or projection (not shown) can be used between annular surfaces that define the space $18C^V$. The shape of the vertical wall $11^V$ also functions to properly located and center the doser $10^V$ inside the container opening. The doser $10^V$ also utilizes a vertical separating wall $15^V$ which extends down from the wall $18^V$ and whose bottom free end is lower than an upper end $14^V$ of the wall $13^V$. The upper end $14^V$ of the wall $13^V$ is spaced from the wall $18^V$ so as to define an entrance opening or gap $17^V$ that allows the substance S stored inside the container 200 to enter into the doser $10^V$ in a manner similar to that described with reference to FIGS. 14A-14D. The wall $18^V$ contains a dispensing opening $19^V$. Like previous embodiments, the doser $10^V$ has an internal volume space $16^V$ that is interrupted by the wad $15^V$. The space $16^V$ between the wall $11^V$ and the wall $15^V$ is in direct communication with the dispensing opening $19^V$ whereas the space between the wall $13^V$ and the wall $15^V$ is not in direct communication with the dispensing opening $19^V$ but is instead in direct communication with opening $17^V$. These openings $17^V$ and $19^V$ have different functions, with the opening $17^V$ serving to allow a container substance S to enter into the space $16^V$; whereas the opening $19^V$ allows any substance disposed inside space $16^V$ to exit from the doser $18^V$. The doser $10^V$ also includes a central projection $18D^V$ to which is mounted a rotatable disk 20". The disk 20" has gripping projections 23" and either sifting openings or a pour opening or both (similar to that shown in FIGS. 19-21). Although not shown in FIG. 17, the disk 20" can be rotated from the closed position shown in FIG. 17 to one or more opening positions wherein one or more openings in the disk 20' are aligned with the dispenser opening $19^V$.

With reference to FIGS. 18-21, there is shown another embodiment of a doser $10^{VI}$. As with previous embodiments, the doser $10^{VI}$ can be installed on a container 200. The doser $10^{VI}$ is similar to that of FIGS. 7-10 but further includes a cylindrical wall $18A^{VI}$ which extends from the vertical wall $11^{VI}$ and extends all the way around so as to abut the container neck. A closure 40 is used to close off the container 200 and also axially retain in place the doser $10^{VI}$. The closure 40 includes a central projection 45 to which is mounted a rotatable disk 20'''. The disk 20''' has gripping projections 23''' as well as sift openings 21''' and a pour opening 22'''. As shown in FIGS. 19-21 the disk 20''' can be rotated (90 degrees) from the closed position shown in FIG. 19 (wherein a closed section of the disk 20''' overlies the dispensing opening $19^{VI}$) to a pour position shown in FIG. 20 (wherein the pour opening 22''' of the disk 20''' overlies the dispensing opening $19^{VI}$) and alternatively rotated (90 degrees) to a sift position shown in FIG. 21 (wherein the sift opening 21''' of the disk 20''' overlie the dispensing opening $19^{VI}$). The projections 23''' allow a user or consumer to more easily rotate the disk 20''' relative to the body of the closure 40 so that the disk 20''' can placed in each of the noted positions. In the embodiment of FIG. 18, it is desired and expected that the opening 49 of the closure 40 be aligned with the dispensing opening $19^{VI}$ with the closure 40 being prevented from rotation when fully installed. However, it is also contemplated that the closure 40 can rotate from the position shown in FIG. 18, to a position wherein the opening 49 is not aligned with the dispensing opening $19^{VI}$. Such a system can be used as a tamper proof mechanism. With such a system, after an initial purchase by a user or consumer, in order to use the container package, they would be need to rotate the closure 40 (from a position closing off the opening $19^{VI}$) relative to the container 200 in order to place the opening 49 into alignment with the opening $19^{VI}$. Whether the package container is in either position shown in FIG. 20 or FIG. 21, it can be used in a manner similar to that shown in FIGS. 14A-14D.

With reference to FIG. 22, there is shown an exploded view of the embodiment of FIG. 18. As should be apparent, the doser $10^{VI}$ is installable on a neck or open upper end 201 of the container 200. As with previous embodiments, the doser $10^{VI}$ includes, among other things, an angled bottom wall $12^{VI}$ and a vertical wall $11^{VI}$ as well as a dispensing opening $19^{VI}$ arranged on a upper wall $18^{VI}$. The closure 40 includes a cylindrical side wall 41 having a cylindrical inner surface 43, as well, as an upper wall 43 having a surrounding flange 44 and a central retaining projecting 45. The central projection 45 is used to retain and centrally mount a rotatable disk 20'''.

With reference to FIGS. 23 and 23A, there is shown one non-limiting way in which a doser $10^{VII}$, similar to that used in FIG. 18, can be retained on the container neck 201. The vertical wall $11A^{VII}$ can include one or more circumferential projections P1 that form a snap engagement with one or more circumferential projections P2 arranged on the container neck 201. These projections P1 and P2 form a retaining arrangement RA. It is also contemplated the projections are replaced with a projection and recess engagement or by merely using a sealing ring between the walls $11^{VII}$ and 201. Such a retaining arrangement RA can be used on any of the embodiments disclosed herein, where practical.

With reference to FIGS. 24-31, there is shown another non-limiting embodiment of a package container which utilizes a container 200 of the type described previously and a doser $10^{VI}$ of the type used in FIG. 18. However, this embodiment utilizes a closure $20^{IV}$ that is of simpler configuration. The closure $20^{IV}$ has the shape of a cap and can optionally include a visual indicator arrow VIA which informs the user or consumer that they need to rotate the closure relative to the container 200 in order to place the same in each of a closed position (see FIGS. 28 and 29) and each of a sift position (see FIGS. 26 and 27) and a pour position (see FIGS. 24 and 25). The closure $20^{IV}$ is rotatable, but is also axially and non-removably retained on the container 200 via engagement between tapered retaining projections RP1 and RP2 (see FIG. 31). As should be apparent from FIGS. 24 and 25 the closure $20^{IV}$ can be rotated (90 degrees) from the closed position shown in FIGS. 28 and 29 (wherein a closed section of the closure overlies the dispensing opening $19^{VI}$) to a pour position shown in FIGS. 24 and 25 (wherein the pour opening $22^{IV}$ overlies the dispensing opening $19^{VI}$) and alternatively rotated (90 degrees) to a sift position shown in FIGS. 26 and 27 (wherein the sift openings $21^{IV}$ overlie the dispensing opening $19^{VI}$). In the embodiment of FIGS. 24-30, it is desired and expected that the closure will be in the position shown in FIGS. 28 and 29 prior to purchase—with the container package or the closure portion thereof being covered with a tamper proof covering such a shrink wrap. As is apparent from FIG. 30, the closure $20^{IV}$ also includes a sidewall $23^{IV}$ and an upper wall $24^{IV}$. The upper wall $24^{IV}$ includes the pour opening $22^{IV}$ and the sift openings $21^{IV}$ and an inner circumferential surface of sidewall $23^{IV}$ includes the circumferential projection RP2.

Figure 32:
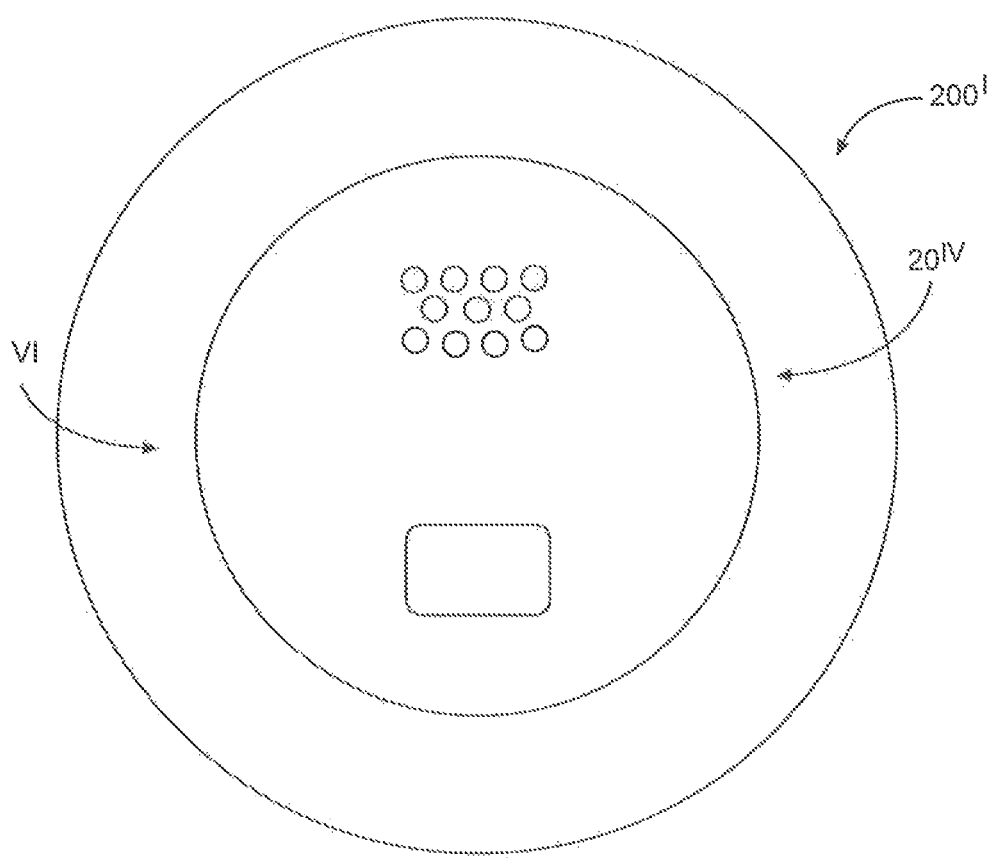
FIG. 32 shows a top view of a container package according to another embodiment of the invention. This embodiment is similar to that of FIG. 24 and additionally utilizes a visual indicator to inform a user or consumer of the rotation position that will align with the dispensing opening of the doser. The rotation position of FIG. 32 is a closed or non-dispensing position.

FIG. 32 shows a top view of a container package according to another embodiment of the invention. This embodiment is similar to that of FIG. 24 and can additionally utilizes a visual indicator VI (not shown) but the location of which would be in a location designated by the arrow to inform a user or consumer of the rotation position of the closure $20^{IV}$ relative to the container 200' that will align with the dispensing opening of the doser (not shown in FIG. 32). The rotation position of FIG. 32 is a closed or non-dispensing position similar to that shown in FIGS. 28 and 29.

The devices described above can also utilize one or more features disclosed in the prior art documents expressly incorporated by reference herein. Furthermore, one or more of the various parts of the device can preferably be made as one-piece structures by e.g., injection molding, when doing so reduces costs of manufacture. Non-limiting materials for all of the parts include synthetic resins such as those approved for food product packaging. The container can, for example, be made of Propylene while the closure can, for example, be made of either PET or PP. Furthermore, the invention also contemplates that any or all disclosed features of one embodiment may be used on other disclosed embodiments, to the extent such modifications function for their intended purpose.

At least because the invention is disclosed herein in a manner that enables one to make and use it, by virtue of the disclosure of particular exemplary embodiments of the invention, the invention can be practiced in the absence of any additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A doser for a container containing a substance, said doser comprising:
    a dosing member sized and configured to be located at least partially inside a dispensing end of a container;
    said dosing member comprising at least a bottom wall, a vertical separating wall, and a retaining wall and a retaining space of predetermined volume configured to retain a dispensable amount of said substance;
    at least the bottom wall and at least a portion of the retaining space being configured to be located inside the dispensing end of the container; and
    a rotatable surface directly overlying the dosing member and being configured to rotate about a center axis of the dosing member while the dosing member remains rotationally stationary relative to the container and having spaced apart first and second dispensing openings,
    wherein, when the doser is arranged on a container, the rotatable surface is configured to rotate while the dosing member remains rotationally static relative to the container and the container dispenses the dispensable amount of said substance through one of the first and second dispensing openings, the dosing member substantially prevents the substance contained in the container from either passing into the retaining space or being dispensed with the dispensable amount.

2. The doser of claim 1, wherein the substance is a liquid.

3. The doser of claim 2, wherein the liquid is a drinkable or consumable liquid.

4. The doser of claim 1, wherein the substance is a particulate substance.

5. The doser of claim 4, wherein the particulate substance is one of:
    a particulate material;
    a powder;
    a dry consumable material; and
    a spice.

6. The doser of claim 1, wherein the predetermined volume comprises one of:
    a teaspoon;
    a fraction of a teaspoon;
    a half teaspoon;
    a tablespoon;
    a fraction of a table spoon; and
    a half tablespoon.

7. The doser of claim 1, wherein the bottom wall is tapered, angled or pitched.

8. The doser of claim 1, wherein the retaining wall is configured to be spaced from an inside surface of the container so as to define a main substance passage.

9. The doser of claim 1, wherein an upper free end of the retaining wall is configured to be spaced from an inside surface of the container so as to define a substance introduction passage.

10. A container comprising:
    the doser of claim 1; and
        the first dispensing opening comprising plural sifting openings allowing passage there-through the dispensable amount of said substance;
        the second dispensing opening comprising a single pouring opening allowing passage there-through of the dispensable amount of said substance.

11. The container of claim 10, further comprising a cap or cover movable to a covering position overlying the doser.

12. A doser for a container containing a liquid or particulate substance, the doser comprising:
    a dosing member sized and configured to be located at least partially inside a container;

said dosing member comprising at least a bottom wall, a vertical separating wall and a retaining wall and being configured to contain and retain a dispensable dose of said substance;

at least the bottom wall and at least a portion of the retaining wall being configured to be located inside the container; and a user-movable dispenser member directly overlying the dosing member and comprising differently configured spaced apart first and second dispensing openings that can each be selectively aligned with a dispensing opening in the dosing member, wherein, when the doser is arranged on a container, the dispenser member is configured to rotate while the dosing member remains rotationally static relative to the container.

* * * * *